(12) United States Patent
Halepovic et al.

(10) Patent No.: US 11,374,998 B1
(45) Date of Patent: Jun. 28, 2022

(54) ADAPTIVE BITRATE STREAMING STALL MITIGATION

(71) Applicants: AT&T Intellectual Property I, L.P., Atlanta, GA (US); THE GOVERNORS OF THE UNIVERSITY OF CALGARY, Calgary (CA)

(72) Inventors: Emir Halepovic, Somerset, NJ (US); Yang Liu, Calgary (CA); Mea Wang, Calgary (CA)

(73) Assignees: AT&T Intellectual Property I, L.P., Atlanta, GA (US); The Governors of the University of Calgary, Calgary (CA)

( * ) Notice: Subject to any disclaimer, the term of this patent is extended or adjusted under 35 U.S.C. 154(b) by 0 days.

(21) Appl. No.: 17/464,018

(22) Filed: Sep. 1, 2021

(51) Int. Cl.
*H04L 65/65* (2022.01)
*H04L 65/80* (2022.01)
*H04L 65/60* (2022.01)

(52) U.S. Cl.
CPC .......... *H04L 65/608* (2013.01); *H04L 65/601* (2013.01); *H04L 65/607* (2013.01); *H04L 65/80* (2013.01)

(58) Field of Classification Search
CPC ... H04L 65/601; H04L 65/608; H04L 65/607; H04L 65/80
See application file for complete search history.

(56) References Cited

U.S. PATENT DOCUMENTS

| | | | |
|---|---|---|---|
| 7,310,529 B1 * | 12/2007 | Lodge | H04W 72/085 455/445 |
| 8,948,249 B2 | 2/2015 | Sun et al. | |
| 9,215,182 B2 | 12/2015 | Gahm et al. | |
| 9,258,333 B2 | 2/2016 | Bichot et al. | |
| 9,306,994 B2 | 4/2016 | Gahm et al. | |
| 9,313,140 B2 * | 4/2016 | Matthews | H04L 47/28 |
| 9,392,304 B2 | 7/2016 | Coudurier et al. | |
| 9,516,078 B2 | 12/2016 | Catchpole et al. | |
| 9,530,451 B2 | 12/2016 | Guerrera et al. | |

(Continued)

OTHER PUBLICATIONS

Bruneau-Queyreix, Joachim, et al., "Multiple Description—DASH: Pragmatic video streaming maximizing End—Users' Quality of Experience", Communications (ICC), 2016 IEEE International Conference on. IEEE, 2016.

(Continued)

*Primary Examiner* — Jonathan A Bui

(57) ABSTRACT

A processing system may determine, during a downloading of a first video chunk associated with a first time block of a video, a risk of stall condition, the first video chunk encoded at a first bitrate of a plurality of available bitrates, determine that a number of a received first plurality of frames of the first video chunk exceeds a threshold, transmit a request for a next video chunk associated with a next time block of the video and an indication to a source device to stop transmitting additional frames of the first video chunk, receive a second plurality of frames of the first video chunk from the source device that were transmitted prior to the source device receiving the indication, receive frames of the next video chunk, and play the first and second plurality of frames of the first video chunk, and the frames of the next video chunk.

20 Claims, 6 Drawing Sheets

(56) References Cited

U.S. PATENT DOCUMENTS

| | | | |
|---|---|---|---|
| 9,866,605 | B2 | 1/2018 | Begen et al. |
| 9,894,421 | B2 | 2/2018 | Dao et al. |
| 10,356,159 | B1* | 7/2019 | Waggoner .......... H04N 21/4621 |
| 10,735,744 | B2 | 8/2020 | Halepovic et al. |
| 2012/0030723 | A1 | 2/2012 | Baum et al. |
| 2016/0219091 | A1 | 7/2016 | Gabin et al. |
| 2017/0111670 | A1 | 4/2017 | Ducloux et al. |
| 2018/0084020 | A1* | 3/2018 | Li .................... H04L 65/602 |
| 2020/0128255 | A1* | 4/2020 | Halepovic .......... H04L 65/4084 |

OTHER PUBLICATIONS

Lin, Wei-Ting, et al., "Efficient AV1 Video Coding Using a Multi-Layer Framework", 2018 Data Compression Conference, 9 pages.

Bouqueau, Romain, "A view on VP9 and AV1 part 1: specifications", GPAC Licensing, Jul. 12, 2016, 8 pages.

Chen, Yue, et al., "An Overview of Core Coding Tools in the AV1 Video Codec", Alliance-for-Open-Media-APSIPA-Transactions-on-Signal-and-URL, PCS 2018, 5 pages.

AT&T Video Optimizer, "Multiple Simultaneous TCP Connections", downloaded from https://developer.att.com/video-optimizer/docs/best-practices/multiple-simultaneous-tcp-connections, 2 pages.

Bultjie, Ronald S., "Overview of the VP9 codec", Random Thoughts posted Dec. 13, 2016, downloaded from https://blogs.gnome.org/rbuttje/2016/12/13/overview-of-the-vp9-video-codec/, 10 pages.

Iyengar, J., et al., "QUIC: A UDP-Based Multplexed and Secure Transport", QUIC, draft-ietf-quic-transport-31, Sep. 25, 2022, 134 pages.

Langley, Adam, et al., "The QUIC Transport Protocol: Design and Internet-Scale Deployment", SIGCOMM '17, Aug. 21-25, 2017, 14 pages.

Webm, "VP8 Encode Parameter Guide", downloaded from https://www.webmproject.org/docs/encoder-parameters/, 12 pages.

Cisco Network Technology, "Overcoming Transport and Link Capacity Limitations Through WAN Optimization", Cisco Press, Jun. 19, 2006, 6 pages.

* cited by examiner

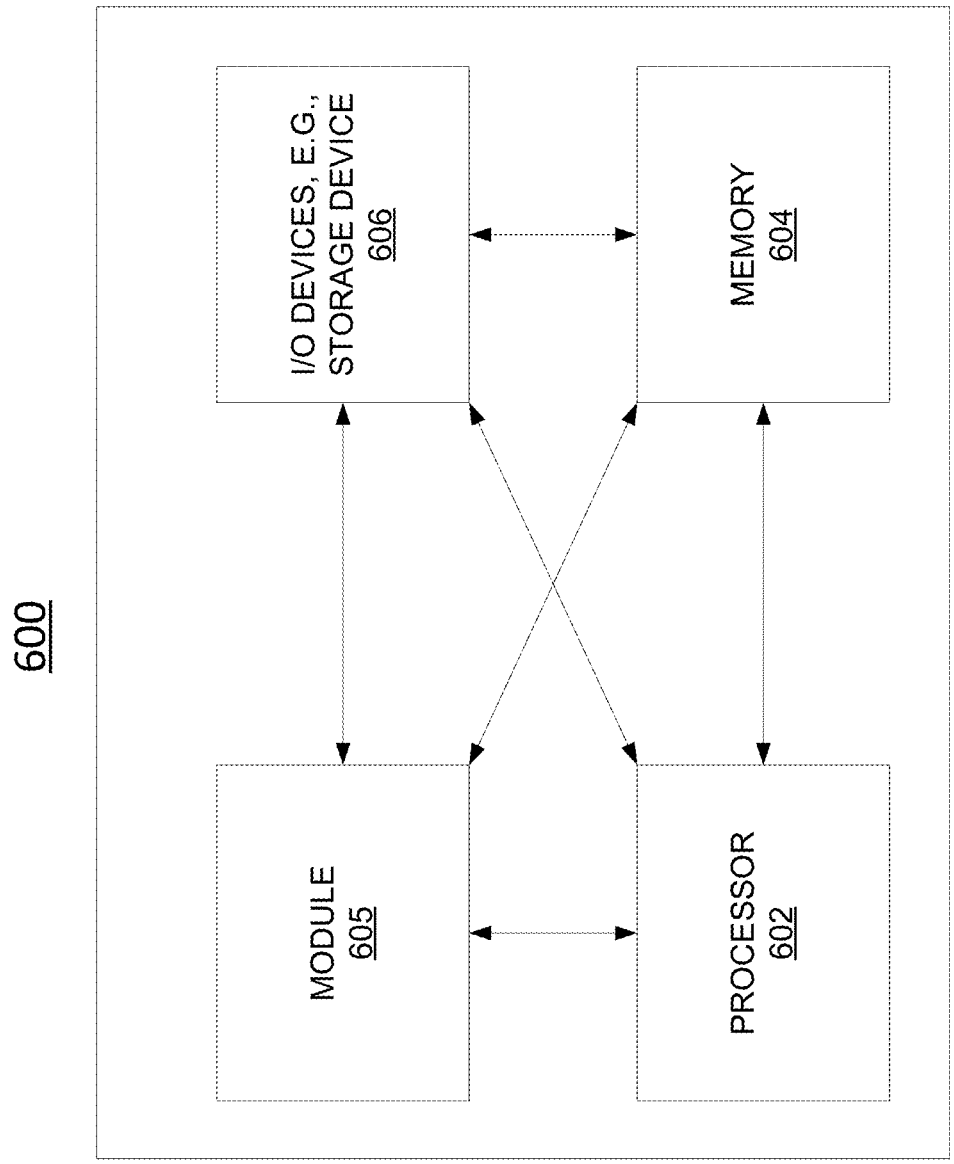

US 11,374,998 B1

ADAPTIVE BITRATE STREAMING STALL MITIGATION

The present disclosure relates generally to adaptive bitrate streaming videos, and more particularly to devices, non-transitory computer-readable media, and methods for receiving and playing frames of a video chunk transmitted by a source device after the sending and prior to the receiving of an indication to stop transmitting additional frames of the video chunk.

BRIEF DESCRIPTION OF THE DRAWINGS

The teachings of the present disclosure can be readily understood by considering the following detailed description in conjunction with the accompanying drawings, in which:

FIG. 6 illustrates a high level block diagram of a computing device or system specifically programmed to perform the steps, functions, blocks and/or operations described herein.

To facilitate understanding, identical reference numerals have been used, where possible, to designate identical elements that are common to the figures.

DETAILED DESCRIPTION

Figure 1:
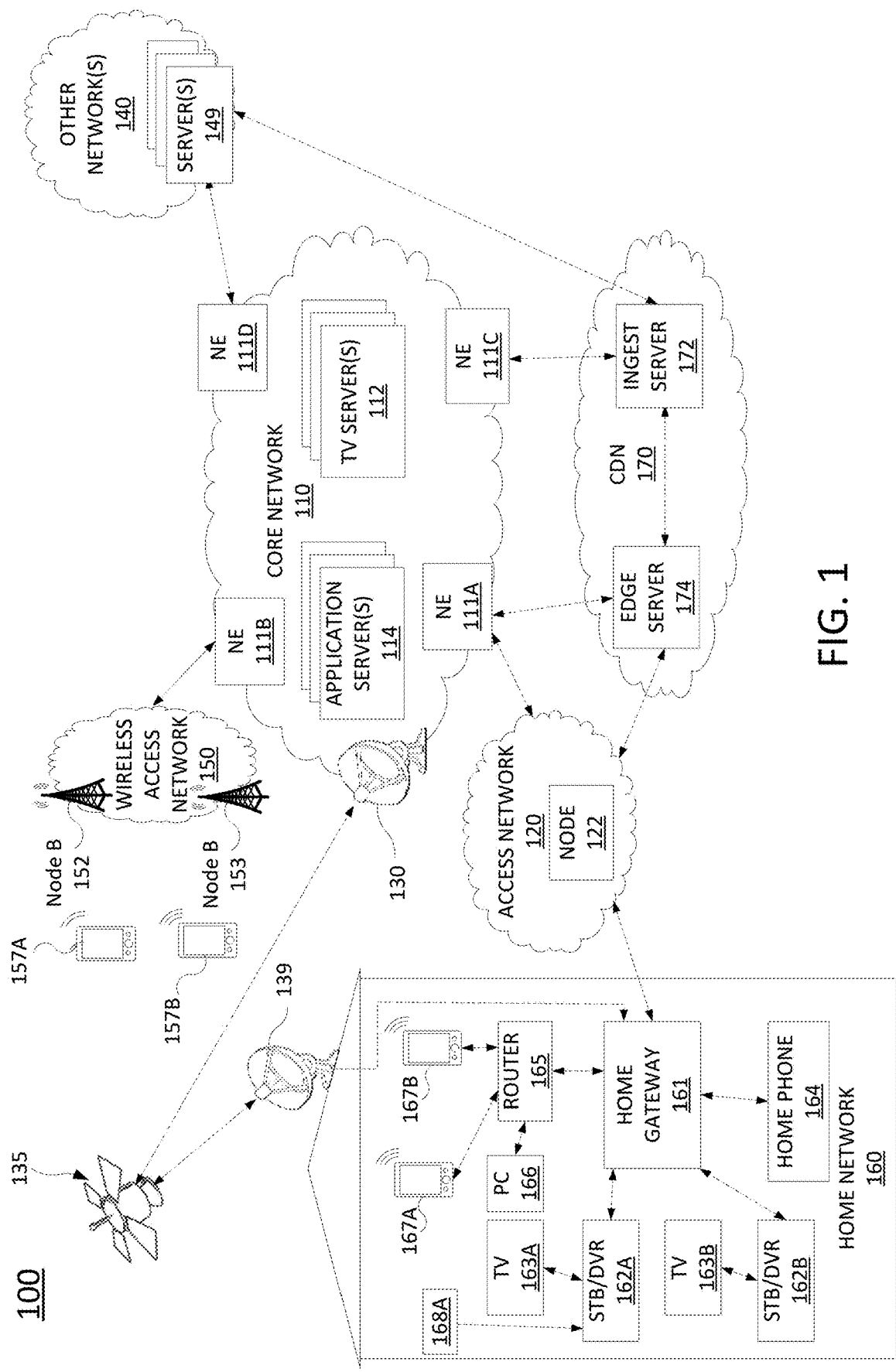
FIG. 1 illustrates an example network related to the present disclosure.

In one example, the present disclosure describes a device, computer-readable medium, and method for receiving and playing frames of a video chunk transmitted by a source device after the sending and prior to the receiving of an indication to stop transmitting additional frames of the video chunk. For instance, a processing system including at least one processor may determine a risk of a stall condition of a playback of a video, where the risk of the stall condition is determined during a downloading of a first video chunk associated with a first time block of a video from a source device, and where the first video chunk is encoded at a first bitrate of a plurality of available bitrates of the video. The processing system may then determine, in response to the risk of the stall condition, that a number of a first plurality of frames of the first video chunk received from the source device exceeds a threshold and transmit a request for a next video chunk associated with a next time block of the video following the first time block and an indication to the source device to stop transmitting additional frames of the first video chunk, in response to the determining that the number of frames exceeds the threshold. The processing system may next receive a second plurality of frames of the first video chunk from the source device, where the second plurality of frames of the first video chunk were transmitted by the source device prior to receiving the indication to stop transmitting the additional frames of the first video chunk and receive a first plurality of frames of the next video chunk. In addition, the processing system may play the first plurality of frames of the first video chunk, the second plurality of frames of the first video chunk, and the first plurality of frames of the next video chunk.

Video delivery technology has shifted from legacy protocols such as Real Time Messaging Protocol (RTMP) and Real Time Streaming Protocol (RTSP) to Hypertext Transfer Protocol (HTTP)-based, adaptive streaming protocols, such as Moving Picture Experts Group (MPEG) Dynamic Adaptive Streaming over HTTP (DASH). A common feature of HTTP-based adaptive streaming protocols is the availability of video in multiple chunks associated with the each time block of a video and having different encoding bitrates, with the chunks linked together by a manifest file, or "index file" that defines all of the variants/tracks (e.g., respective sets of chunks, each set at a different bitrate/encoding level) of the video.

In one example, a video chunk (broadly a "chunk") may comprise a sequence of video and/or audio frames for a time block of a video that is encoded at a particular bitrate (e.g., a target bitrate, or "encoding level"). In one example, a chunk may be referred to as a segment, when the chunks of an adaptive bitrate video are stored as individual data files separate from other chunks. In such an example, the chunk (e.g., a segment) may be obtained by a requesting device, such as a player device, via a uniform resource locator (URL) identifying a file containing the chunk. In another example, a chunk may be stored and/or made available as a portion of a file which may contain multiple chunks or even an entire variant/track. In this case, the chunk may be referred to as a "fragment." In addition, such a chunk (e.g., a fragment) may be obtained via a URL identifying the file containing the chunk and a byte range, timestamp, index, sequence number, or the like to distinguish the chunk from other chunks in the same file. The URL(s) and other information that may be used by a player device to request and obtain chunks of an adaptive bitrate video may be stored in a manifest file which may be obtained by the player device in advance of a streaming session.

A time block of an adaptive bitrate video may have multiple associated chunks at respective bitrates. In particular, each of these associated chunks may be of a respective variant for the video. In addition, each variant may comprise a set of chunks encoded at a same bitrate (e.g., a target bitrate) and covering successive time blocks so as to constitute a complete copy of the video at the (target) bitrate for that variant. The time blocks may have a duration that is defined in advance in accordance with an adaptive bitrate protocol and/or set according to a preference of a video player vendor, a video service provider, a network operator, a video creator, a transcoder vendor, and so forth. In one example, chunks may be associated with particular time blocks of a video via sequence numbers, index numbers/indices, or the like which indicate a relative (temporal) order of the time blocks within the overall video. For instance, time block indicators for each available chunk may be included in the manifest file so that a player device may determine which chunks may be requested for each time block and so that the player device may determine which chunk(s) to request next (e.g., for successive time blocks).

A variety of factors may affect users' quality of experience for video streaming. These include video stalls, startup delay, and poor video/audio quality. Adaptive bitrate (ABR) streaming over HTTP is widely adopted since it offers significant advantages in terms of both user-perceived quality and resource utilization for content and network service providers. Unlike video downloads that must complete fully before playback can begin, streaming video starts playing within seconds. With ABR-based streaming, each video is encoded at a number of different rates (called variants) and stored on servers as separate files. A video client running on a mobile device, home television, game console, web browser, etc. chooses which video rate to stream by monitoring network conditions and estimating the available network capacity.

The function of the ABR algorithm is to select ABR variants (called representations in DASH) in real time to maximize video quality and minimize re-buffering events. Typically, a video client maintains a media cache (also referred to as a "buffer" or "video buffer"), by pre-fetching video chunks, then playback occurs from the cache. For each time block of a video-on-demand (VoD) program/live channel, the video client selects which variant (chunk) of that time block to download into the cache. Higher quality chunks for a given time block are larger in size (data volume) and take longer to download than lower quality chunks. In general, the goal is to download as high quality a chunk as possible each time while keeping the buffer from going empty.

One approach to variant or chunk selection is channel capacity estimation, which uses chunk download time as an estimate of available channel bitrate. The video client selects a chunk of a variant having a bitrate/encoding level that most closely matches the channel bitrate without exceeding it. In an environment where throughput is highly variable, such as a mobile network, accurate estimation of future channel capacity is challenging.

Another approach uses a current buffer level (e.g., a measure of an amount of time of video stored in the buffer to be played out), instead of estimated channel bandwidth, to select the bitrate/encoding level of the next chunk. As with capacity estimation, the objective is to balance the flow of data into the buffer with the outflow, to keep the buffer from going empty or overflowing. Unlike with channel capacity estimation, for buffer occupancy-based approach, the actual buffer level is used to select the next chunk, e.g., with a linear, or approximately linear, mapping function. The higher the current buffer level, the higher the bitrate selected for the next chunk for the next time block, and vice versa: the lower the buffer level, the lower the variant bitrate selected. This ensures conservative behavior, e.g., selecting minimum quality/chunk size, when the buffer is low, i.e., filling the buffer more quickly using a chunk of a lower variant and aggressive behavior, e.g., selecting maximum quality/chunk size, when the buffer is full or nearly so, i.e., filling the buffer more slowly using a chunk of a higher variant.

In response to bandwidth drops and/or buffer depletion, a client may request a chunk for the same time block at a lower quality level (lower bitrate variant) and may discard the partially downloaded chunk, which results in bandwidth waste. This also increases the chance of playback stalls, and leads to a lower average bitrate of the chunks downloaded and more frequent quality switches. In contrast, examples of the present disclosure provide improved bandwidth efficiency, while maintaining the video quality and visual stability. In particular, examples of the present disclosure enable the use of partial video chunks at an ABR video player, and further enable the use of frames that are transmitted by a server after the ABR video player predicts a stall (or at least determines a risk of a potential stall condition) and determines to move on to a next chunk for a next time block of the video, but before a notification send by the video player is received and acted upon by the server.

In one example, the present disclosure may exploit the temporal property of inter-frame coding protocols (such as, Advanced Video Coding (AVC) and High Efficiency Video Coding (HEVC)) and prioritize frames within a video chunk so that reference frames (frames for successfully decoding temporal information) are sent first followed by non-reference frames (optional frames). It has been confirmed that varying the temporal property has no impact on spatial and amplitude properties of a video, while spatial and amplitude features are inter-dependent. Moreover, altering the temporal property has less negative impact on video quality than altering spatial and amplitude properties. In one example, frames of a video chunk are organized in a designated order comprising a plurality of intra-frame coded frames (e.g., I-frames) followed by a plurality of inter-frame coded frames. In one example, the plurality of inter-frame coded frames comprises a plurality of forward predicted frames (e.g., P-frames) and a plurality of bidirectional predicted frames. In addition, in one example, the plurality of bidirectional predicted frames may comprise a plurality of reference bidirectional predicted frames (e.g., B-frames) and a plurality of non-reference bidirectional predicted frames (e.g., b-frames). The designated order may further comprise, as related to the plurality of inter-frame coded frames, the plurality of forward predicted frames, followed by the plurality of reference bidirectional predicted frames, and followed by the plurality of non-reference bidirectional predicted frames. In one example, the designated order may further include a random order of the plurality of bidirectional predicted frames of the video chunk.

In particular, the frames at the end of a video chunk are the most likely to not be received before a timeout (e.g., for dropping the chunk and switching to a lower bitrate variant). However, with non-reference frames placed at the end of the video chunk, the likelihood that all reference frames will be received before the timeout is increased. It should be noted that the loss of non-reference frames will not hinder decoding, but may lead to quality distortion within the temporal domain. The level of distortion may vary depending on motion activity (MA) and the rate of change of motion activity from one group of pictures (GOP) to the next. Thus, in one example, a per-chunk loss tolerance level is defined which sets the number of frames of a video chunk for which a partial chunk may be accepted by the video player (e.g., instead of dropping the chunk and switching to a lower bitrate variant for the same time block in response to a predicted stall). As described in greater detail below, the use/acceptance of partial chunks (also referred to as dropping or chopping the tail of a chunk) allows for a more continuous range of visual qualities to be obtained, with less switching between discrete bitrates/encoding levels and a better overall quality of experience to end users.

In one example, the present disclosure may relate to ABR videos using a forward encoding scheme (e.g., a non-bidirectional forward encoding scheme), such as AV1 (Alliance for Open Media (AOMedia) Video 1). For instance, transmission of a group of pictures (GOP) in AV1 comprises frames in a playback order. In addition, since nearly all frames are reference frames, there may be no practical benefit to reordering of frames for transmission (such as for AVC and HEVC as described herein). As such, an ABR video player/client may not need to wait for later frame(s) to arrive to decode an earlier received frame. Thus, examples of the present disclosure may more simply accept a partial chunk at the ABR player device when a cutoff time is reached before receiving the full chunk. In addition, in one example, the present disclosure does not need any changes to an encoder/transmitter/server side for AV1.

In Transmission Control Protocol (TCP), packets are sent in windows, or bursts, called "congestion windows." In particular, the sender TCP service or agent (e.g., the server) may use flow control and congestion control. The TCP service may send a burst of packets from a TCP transmit queue, wait for an acknowledgement, send another burst of packets after acknowledgement, wait for another acknowledgement, sends another burst of packets after the acknowledgement, etc. Congestion windows normally grow in size as the time of a video progresses and then eventually stabilizes when the sender determines that it has an optimal window size based upon network bandwidth. However, the network bandwidth may be unstable, may drop temporarily and/or unexpectedly, and so forth, for a variety of reasons, such that the actual network bandwidth may be less than the expected/predicted network bandwidth. In such case, the bandwidth may not support the full downloading of a chunk by a player device before a timeout for downloading the chunk. In other words, the player device may predict a stall or that there is a risk of a stall. In one example, if the buffer is healthy, e.g., more than 75 percent full, more than 80 percent full, etc., the player device may ignore the timeout and continue to wait for packets of a current chunk to arrive. For instance, in many cases, the network bandwidth drop may be very short lived, and may recover such that the entire chunk may be downloaded while the buffer occupancy may drop only slightly (e.g., a few percentage points). However, if the buffer occupancy is low (e.g., below 25 percent, below 2 seconds worth of the video, below 1 second worth of the video, etc.), and the timeout is reached, the player device may make a decision as to whether to accept a partial chunk and drop the tail, or to request a download of a chunk for a different variant for the same segment/time period. As noted above, in one example, a per-chunk loss tolerance level may be defined which sets the number of frames of a video chunk for which a partial chunk may be accepted by the video player (e.g., instead of dropping the chunk and switching to a lower bitrate variant for the same time block in response to a predicted stall). In another example, a same threshold may be set for all chunks, such as 80 percent of the chunk, 85 percent of the chunk, etc.

In either case, requesting a different chunk/variant for the same segment/time period at a lower bitrate, or dropping the tail and moving on to a chunk for a next time period, the player device may send a reset (RST) packet to the server/encoder. The reset packet essentially closes the TCP connection and causes the server to stop sending packets on the connection. However, by the time the reset packet reaches the server, there are potentially a few more packets or windows of packets that have already been sent by the server into the network, and thus there are some additional packets or windows of packets that are still in transit on their way toward the player. These packets or windows of packets in the network that have not yet reached the player may be referred to as packets "in flight" (e.g., comprising frames of the chunk that are "in flight"). In addition, there may be multiple groups of windows of packets in flight somewhere within the system/network. To illustrate, when the player reaches a timeout for downloading a chunk and decides it may have enough of the chunk (which could be the first six windows of packets from the segment, for example), there may be two or three more windows behind it, all or a portion of which the server may place onto the network before receiving a reset packet (e.g., a RST packet).

While these packets/windows of packets may still be delivered to the player device, the packets may not be delivered to the video player application according to particular versions of TCP. In particular, the sending of the reset packet by the player device may cause the connection to be considered closed and the received packets may be discarded. In the meantime, the player device/client may send a packet to open a new connection and request a chunk for the next segment/time period (which may be at a different, lower bitrate). However, the SYN/ACK packet for the new connection setup may be queued up in the network and in transit behind the last packet/window of packets sent for the prior chunk for which the tail was dropped. If there is a bottleneck in the network, the new packets and/or windows of packets from the new chunk or connection setup phase may still be behind all of the packets/windows of packets in flight from the prior chunk.

Compared to HEVC and AVC, in AV1 the tail ends up being smaller because the chunk, or segment is smaller due to codec efficiency, and also GOPs are smaller. Since HEVC and AVC have many more b frames compared to reference frames, more of the chunk at the tail can be dropped. In AV1, nearly all frames are reference frames. In any case, AV1 does not allow as many frames to be dropped and as much percentage of a chunk to be dropped while maintaining acceptable visual quality. Thus, in AV1, the video player may not be able to as quickly to drop a tail and move on to a chunk of a next time block as compared to AVC and HEVC. For instance, it may be an acceptable loss to drop 20% of a chunk in AV1, whereas 40-60 percent of a chunk in HEVC and AVC may be dropped. Notably, waiting until 80% of a chunk is received in AV1 (under falling network bandwidth conditions) reduces the chance of avoiding a stall in video playback. In addition, the video player may still need to wait for packets in flight because they are in front of the packets from the newly requested chunk. Moreover, in one example of TCP, the packets in flight from the prior chunk are not usable because the client has closed the connection and opened a new connection with the server. Packets are still delivered by the network/system to the TCP service of the player device, but since the TCP socket and/or connection is closed, the packets may simply be discarded before being provided to the video player application.

In contrast, the present disclosure seeks to use these packets in flight and extend playback before packets of a next chunk are received (and which are queued up behind these packets in flight). To use packets in flight, in one example, the present disclosure may change the underlying transport protocol. For instance, in one example, the present disclosure employs two streams, one for a current chunk being received and for which the tail is being dropped, and another for receiving a next chunk for a next time block of the video. In one example, the first stream and the second stream may be part of a same transport connection. For instance, in one example, the present disclosure implements QUIC (Quick Uniform Datagram Protocol (UDP) Internet Connections) streams within a QUIC connection. In particular, QUIC works over UDP with all reliability, flow control, and congestion control moved into the application layer. These functions are part of the transport layer in TCP, which is controlled by the operating system and not the applications running thereon. Using TCP, since an ABR video player application cannot manipulate the transport layer, when the application requests a connection to be closed, the TCP service closes the connection, and any packets of the connection that still arriving cannot be delivered to the ABR video player application.

QUIC moves control into the application layer and introduces the concept of streams, where there may be multiple streams inside a single QUIC connection, or flow. In QUIC, it is possible for a recipient to tell a sender to stop sending on a single stream, while other streams persist within the same QUIC connection. Thus, the connection may remain open. Accordingly, with a protocol such as QUIC that enables multiple streams in a single connection, there is no need to send a reset packet, close a connection, open a new connection, etc. Instead, an ABR video player application may send a packet to request a server to stop sending on stream 1, and immediately after may send a packet requesting a new chunk via stream 2, for example. In another example, a single packet over stream 1 or stream 2 may signal to the server to both stop sending packets of the first chunk on stream 1 and to begin sending packets of the next chunk for the next time block on stream 2.

Upon receiving an instruction for dropping the tail of a current chunk, the server may stop sending packets for the current chunk (e.g., on stream 1), although there may still be some packets/windows of packets in flight before the "stop sending" packet/instruction arrives at the server. However, the server can also immediately start sending new packets for the next chunk of the next time block of the video (e.g., via the second stream). In addition, the ABR video player application/client can still receive packets in flight for the first chunk, and can use these packets (e.g., comprising video frames of the first chunk) to extend the playback while awaiting the first packet and/or frame from the next chunk of the next time block of the video. Thus, it is more likely to avoid a stall in the video playback before the first packet of the new chunk arrives, or at a minimum, reduces the duration of the stall compared to implementations over TCP in which the connection is closed and packets in flight are lost/discarded.

Although examples of the present disclosure are described primarily in connection with QUIC, the present disclosure may be implemented with any transport protocol where the server/sender can be told to stop packet transmission, without actually closing the connection, and that allows the player/client to receive packets in flight, whether packets of the next chunk are sent and received over a different stream in a same connection or in a new connection while the old connection is held open. Accordingly, examples of the present disclosure may implement any proposed or future transport protocol or application layer techniques over UDP or the like, e.g., as an alternatively or complementary to QUIC.

Examples, of the present disclosure may be practically implemented within any existing HAS system. The video player downloads a metadata file (such as the manifest file, or media presentation description (MPD) in DASH), which contains information about variant quality levels (e.g., bitrate, resolution, frame rate, etc.). The metadata file may include additional information on video chunk size, offset (e.g., the number of reference frames) and per-chunk loss tolerance levels. The video player may use this information to dynamically make a decision to drop or continue downloading, based on the current fraction of a video chunk downloaded, such that video quality, stability, and bandwidth efficiency can be maintained during the video session. Examples of the present disclosure may be integrated into a video player as a plug-in with one or more options that can be enabled or disabled, e.g., depending upon if the video is stored and/or transmitted in accordance with a frame reordering as described herein (such as for HEVC and AVC), if the video is AV1 or other forward encoding/non-bidirectional encoding formats, etc.

It should also be noted that although examples of the present disclosure are described primarily in connection with a video client and video streaming, examples of the present disclosure may be similarly applied to other types of streaming media, such as adaptive bitrate streaming audio. In addition, although aspects of the present disclosure may be most applicable in the context of live streaming with shallow buffers, the present disclosure may be equally applicable to on-demand streaming of recorded programs. These and other aspects of the present disclosure are described in greater detail below in connection with the examples of FIGS. 1-6.

To better understand the present disclosure, FIG. 1 illustrates an example network 100, related to the present disclosure. As shown in FIG. 1, the network 100 connects mobile devices 157A, 157B, 167A and 167B, and home network devices such as home gateway 161, set-top boxes (STBs) 162A and 162B, television (TV) 163A and TV 163B, home phone 164, router 165, personal computer (PC) 166, and so forth, with one another and with various other devices via a core network 110, a wireless access network 150 (e.g., a cellular network), an access network 120, other networks 140, content distribution network (CDN) 170, and/or the Internet in general. For instance, connections between core network 110, access network 120, home network 160, CDN 170, wireless access network 150 and other networks 140 may comprise the Internet in general, internal links under the control of single telecommunication service provider network, links between peer networks, and so forth.

In one example, wireless access network 150 may comprise a radio access network implementing such technologies as: Global System for Mobile Communication (GSM), e.g., a Base Station Subsystem (BSS), or IS-95, a Universal Mobile Telecommunications System (UMTS) network employing Wideband Code Division Multiple Access (WCDMA), or a CDMA3000 network, among others. In other words, wireless access network 150 may comprise an access network in accordance with any "second generation" (2G), "third generation" (3G), "fourth generation" (4G), Long Term Evolution (LTE), "fifth generation" (5G) or any other yet to be developed future wireless/cellular network technology. While the present disclosure is not limited to any particular type of wireless access network, in the illustrative example, wireless access network 150 is shown as a UMTS terrestrial radio access network (UTRAN) subsystem. Thus, elements 152 and 153 may each comprise a Node B or evolved Node B (eNodeB). In one example, wireless access network 150 may be controlled and/or operated by a same entity as core network 110.

In one example, each of the mobile devices 157A, 157B, 167A, and 167B may comprise any subscriber/customer endpoint device configured for wireless communication such as a laptop computer, a Wi-Fi device, a Personal Digital Assistant (PDA), a mobile phone, a smartphone, an email device, a computing tablet, a messaging device, and the like. In one example, any one or more of mobile devices 157A, 157B, 167A, and 167B may have both cellular and non-cellular access capabilities and may further have wired communication and networking capabilities.

As illustrated in FIG. 1, network 100 includes a core network 110. In one example, core network 110 may combine core network components of a cellular network with components of a triple play service network; where triple play services include telephone services, Internet services and television services to subscribers. For example, core network 110 may functionally comprise a fixed mobile convergence (FMC) network, e.g., an IP Multimedia Subsystem (IMS) network. In addition, core network 110 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VoIP) telephony services. Core network 110 may also further comprise a broadcast television network, e.g., a traditional cable provider network or an Internet Protocol Television (IPTV) network, as well as an Internet Service Provider (ISP) network. The network elements 111A-111D may serve as gateway servers or edge routers to interconnect the core network 110 with other networks 140, wireless access network 150, access network 120, and so forth. As shown in FIG. 1, core network 110 may also include a plurality of television (TV) servers 112, and a plurality of application servers 114. For ease of illustration, various additional elements of core network 110 are omitted from FIG. 1.

With respect to television service provider functions, core network 110 may include one or more television servers 112 for the delivery of television content, e.g., a broadcast server, a cable head-end, and so forth. For example, core network 110 may comprise a video super hub office, a video hub office and/or a service office/central office. In this regard, television servers 112 may include content server(s) to store scheduled television broadcast content for a number of television channels, video-on-demand (VoD) programming, local programming content, and so forth. Alternatively, or in addition, content providers may stream various contents to the core network 110 for distribution to various subscribers, e.g., for live content, such as news programming, sporting events, and the like. Television servers 112 may also include advertising server(s) to store a number of advertisements that can be selected for presentation to viewers, e.g., in the home network 160 and at other downstream viewing locations. For example, advertisers may upload various advertising content to the core network 110 to be distributed to various viewers. Television servers 112 may also include interactive TV/video-on-demand (VoD) server(s) and/or network-based digital video recorder (DVR) servers, as described in greater detail below.

In one example, the access network 120 may comprise a Digital Subscriber Line (DSL) network, a broadband cable access network, a Local Area Network (LAN), a cellular or wireless access network, a $3^{rd}$ party network, and the like. For example, the operator of core network 110 may provide a cable television service, an IPTV service, or any other types of television service to subscribers via access network 120. In this regard, access network 120 may include a node 122, e.g., a mini-fiber node (MFN), a video-ready access device (VRAD) or the like. However, in another example, node 122 may be omitted, e.g., for fiber-to-the-premises (FTTP) installations. Access network 120 may also transmit and receive communications between home network 160 and core network 110 relating to voice telephone calls, communications with web servers via other networks 140, content distribution network (CDN) 170 and/or the Internet in general, and so forth. In another example, access network 120 may be operated by a different entity from core network 110, e.g., an Internet service provider (ISP) network.

Alternatively, or in addition, the network 100 may provide television services to home network 160 via satellite broadcast. For instance, ground station 130 may receive television content from television servers 112 for uplink transmission to satellite 135. Accordingly, satellite 135 may receive television content from ground station 130 and may broadcast the television content to satellite receiver 139, e.g., a satellite link terrestrial antenna (including satellite dishes and antennas for downlink communications, or for both downlink and uplink communications), as well as to satellite receivers of other subscribers within a coverage area of satellite 135. In one example, satellite 135 may be controlled and/or operated by a same network service provider as the core network 110. In another example, satellite 135 may be controlled and/or operated by a different entity and may carry television broadcast signals on behalf of the core network 110.

As illustrated in FIG. 1, core network 110 may include various application servers 114. For instance, application servers 114 may be implemented to provide certain functions or features, e.g., a Serving-Call Session Control Function (S-CSCF), a Proxy-Call Session Control Function (P-CSCF), or an Interrogating-Call Session Control Function (I-CSCF), one or more billing servers for billing one or more services, including cellular data and telephony services, wire-line phone services, Internet access services, and television services. Application servers 114 may also include a Home Subscriber Server/Home Location Register (HSS/HLR) for tracking cellular subscriber device location and other functions. An HSS refers to a network element residing in the control plane of an IMS network that acts as a central repository of all customer specific authorizations, service profiles, preferences, etc. Application servers 114 may also include an IMS media server (MS) for handling and terminating media streams to provide services such as announcements, bridges, and Interactive Voice Response (IVR) messages for VoIP and cellular service applications. The MS may also interact with customers for media session management. In addition, application servers 114 may also include a presence server, e.g., for detecting a presence of a user. For example, the presence server may determine the physical location of a user or whether the user is "present" for the purpose of a subscribed service, e.g., online for a chatting service and the like. In one example, application servers 114 may include data storage servers to receive and store manifest files regarding adaptive bitrate streaming videos maintained within TV servers 112 and/or available to subscribers of core network 110 and stored in server(s) 149 in other networks 140. It should be noted that the foregoing are only several examples of the types of relevant application servers 114 that may be included in core network 110 for storing information relevant to providing various services to subscribers.

In accordance with the present disclosure, other networks 140 and servers 149 may comprise networks and devices of various content providers of ABR videos. In one example, each of the servers 149 may also make available manifest files which describe the variants of a video and the segments/video chunks thereof which are stored on the respective one of the servers 149. For instance, there may be several video chunks containing video and audio for the same time block (e.g., a 2-10 second portion) of the video, but which are encoded at different bitrates in accordance with an adaptive bitrate streaming protocol. Thus, an adaptive bitrate streaming video player may request and obtain any one of the different video chunks for the time block, e.g., depending upon a state of a video buffer of the adaptive bitrate streaming video player, depending upon network bandwidth or other network conditions, depending upon the access rights of the adaptive bitrate streaming video player to different variants (e.g., to different encoding levels/bitrates) according to a subscription plan and/or for the particular video, and so forth.

In one example, home network 160 may include a home gateway 161, which receives data/communications associated with different types of media, e.g., television, phone, and Internet, and separates these communications for the appropriate devices. The data/communications may be received via access network 120 and/or via satellite receiver 139, for instance. In one example, television data is forwarded to set-top boxes (STBs)/digital video recorders (DVRs) 162A and 162B to be decoded, recorded, and/or forwarded to television (TV) 163A and TV 163B for presentation. Similarly, telephone data is sent to and received from home phone 164; Internet communications are sent to and received from router 165, which may be capable of both wired and/or wireless communication. In turn, router 165 receives data from and sends data to the appropriate devices, e.g., personal computer (PC) 166, mobile devices 167A, and 167B, and so forth. In one example, router 165 may further communicate with TV (broadly a display) 163A and/or 163B, e.g., where one or both of the televisions is a smart TV. In one example, router 165 may comprise a wired Ethernet router and/or an Institute for Electrical and Electronics Engineers (IEEE) 802.11 (Wi-Fi) router, and may communicate with respective devices in home network 160 via wired and/or wireless connections.

Figure 5:
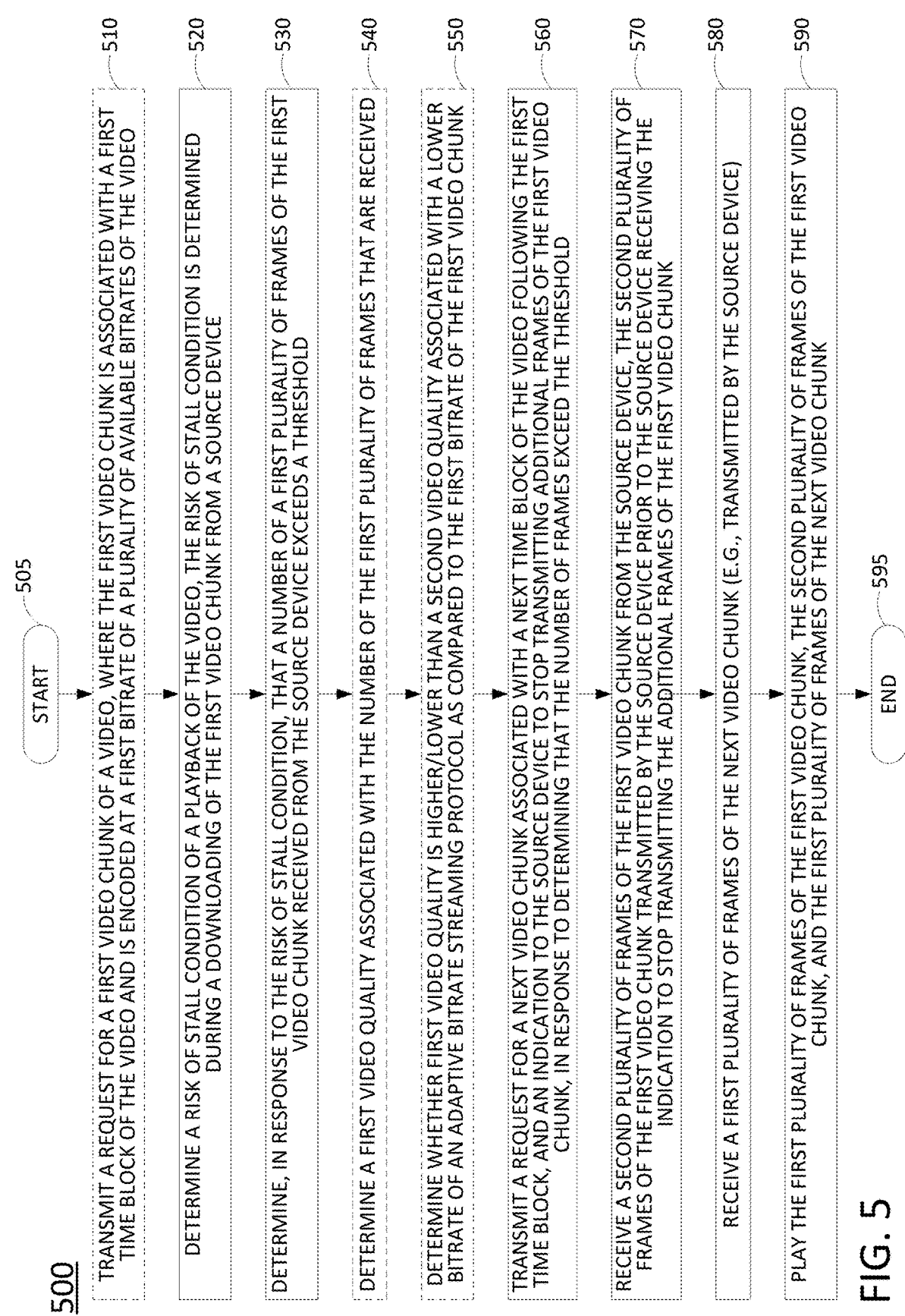
FIG. 5 illustrates a flowchart of an example method for receiving and playing frames of a video chunk transmitted by a source device after the sending and prior to the receiving of an indication to stop transmitting additional frames of the video chunk.

In one example, one or both of the STB/DVR 162A and STB/DVR 162B may comprise all or a portion of a computing device or system, such as computing system 600, and/or processing system 602 as described in connection with FIG. 6 below, specifically configured to perform various steps, functions, and/or operations for receiving and playing frames of a video chunk transmitted by a source device after the sending and prior to the receiving of an indication to stop transmitting additional frames of the video chunk. Among other functions, STB/DVR 162A and STB/DVR 162B may comprise adaptive bitrate streaming video players capable of playing adaptive bitrate streaming videos in formats such as AV1 (AOMedia Video 1), H.264 (Advanced Video Coding (AVC)), H.265 (High Efficiency Video Coding (HEVC)), Moving Picture Expert Group (MPEG) .mpeg files, .mov files, .mp4 files, .3gp files, .f4f files, .m3u8 files, or the like. A flowchart of an example method of receiving and playing frames of a video chunk transmitted by a source device after the sending and prior to the receiving of an indication to stop transmitting additional frames of the video chunk is illustrated in FIG. 5 and described in greater detail below. Although STB/DVR 162A and STB/DVR 162B are illustrated and described as integrated devices with both STB and DVR functions, in other, further, and different examples, STB/DVR 162A and/or STB/DVR 162B may comprise separate STB and DVR devices.

It should be noted that in one example, another device may provide one or more operations or functions for receiving and playing frames of a video chunk transmitted by a source device after the sending and prior to the receiving of an indication to stop transmitting additional frames of the video chunk, as described herein, and may comprise an adaptive bitrate streaming video player capable of playing adaptive bitrate streaming videos. For instance, one or more of the mobile devices 157A, 157B, 167A and 167B, and/or PC 166 may also comprise all or a portion of a computing device or system, such as computing system 600, and/or processing system 602 as described in connection with FIG. 6 below, specifically configured to perform various steps, functions, and/or operations for receiving and playing frames of a video chunk transmitted by a source device after the sending and prior to the receiving of an indication to stop transmitting additional frames of the video chunk, as described herein.

In addition, it should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 6 and discussed below) or multiple computing devices collectively configured to perform various steps, functions, and/or operations in accordance with the present disclosure.

Network 100 may also include a content distribution network (CDN) 170. In one example, CDN 170 may be operated by a different entity from the core network 110. In another example, CDN 170 may be operated by a same entity as the core network 110, e.g., a telecommunication service provider. In one example, the CDN 170 may comprise a collection of cache servers distributed across a large geographical area and organized in a tier structure. The first tier may comprise a group of servers that accesses content web servers (e.g., origin servers) to pull content into the CDN 170, referred to as an ingestion servers, e.g., ingest server 172. The content may include videos, content of various webpages, electronic documents, video games, etc. A last tier may comprise cache servers which deliver content to end user, referred to as edge caches, or edge servers, e.g., edge server 174. For ease of illustration, a single ingest server 172 and a single edge server 174 are shown in FIG. 1. In between the ingest server 172 and edge server 174, there may be several layers of servers (omitted from the illustrations), referred to as the middle tier. In one example, the edge server 174 may be multi-tenant, serving multiple content providers, such as core network 110, content providers associated with server(s) 149 in other network(s) 140, and so forth. In one example, edge server 174 may comprise an adaptive bitrate streaming video server. In addition, in one example, ingest server 172 and/or edge server 174 may comprise all or a portion of a computing device or system, such as computing system 600, and/or processing system 602 as described in connection with FIG. 6 below, specifically configured to perform various steps, functions, and/or operations in connection with receiving and playing frames of a video chunk transmitted by a source device after the sending and prior to the receiving of an indication to stop transmitting additional frames of the video chunk.

As mentioned above, TV servers 112 in core network 110 may also include one or more interactive TV/video-on-demand (VoD) servers and/or network-based DVR servers. In one example, an interactive TV/VoD server and/or DVR server may comprise all or a portion of a computing device or system, such as computing system 600, and/or processing system 602 as described in connection with FIG. 6 below, specifically configured to perform various steps, functions, and/or operations in connection with receiving and playing frames of a video chunk transmitted by a source device after the sending and prior to the receiving of an indication to stop transmitting additional frames of the video chunk, as described herein. Among other things, an interactive TV/VoD server and/or network-based DVR server may function as a server for STB/DVR 162A and/or STB/DVR 162B, one or more of mobile devices 157A, 157B, 167A and 167B, and/or PC 166 operating as a client for requesting and receiving a manifest file for an adaptive bitrate streaming video, as described herein. For example, STB/DVR 162A may present a user interface and receive one or more inputs (e.g., via remote control 168A) for a selection of an adaptive bitrate streaming video. STB/DVR 162A may request the video from an interactive TV/VoD server and/or network-based DVR server, which may retrieve the manifest file for the video from one or more of application servers 114 and provide the manifest file to STB/DVR 162A. STB/DVR 162A may then obtain video chunks of the video as identified in the manifest file.

In one example, the manifest file may direct the STB/DVR 162A to obtain the video chunks from edge server 174 in CDN 170. The edge server 174 may already store the video chunks of the video and may deliver the video chunks upon a request from the STB/DVR 162A. However, if the edge server 174 does not already store the video chunks, upon request from the STB/DVR 162A, the edge server 174 may in turn request the video chunks from an origin server. The origin server that stores chunks of the video may comprise, for example, one of the servers 149 or one of the TV servers 112. The chunks of the video may be obtained from an origin server via ingest server 172 before being passed to the edge server 174. In one example, the ingest server 172 may also pass the video chunks to other middle tier servers and/or other edge servers (not shown) of CDN 170. The edge server 174 may then deliver the video chunks to the STB/DVR 162A and may store the video chunks until the video chunks are removed or overwritten from the edge server 174 according to any number of criteria, such as a least recently used (LRU) algorithm for determining which content to keep in the edge server 174 and which content to delete and/or overwrite.

It should be noted that a similar process may involve other devices, such as TV 163A or TV 163B (e.g., "smart" TVs), mobile devices 167A, 167B, 157A or 157B obtaining a manifest file for a video from one of the TV servers 112, from one of the servers 149, etc., and requesting and obtaining video chunks of the video from edge server 174 of CDN 170. In this regard, it should be noted that edge server 174 may comprise a server that is closest to the requesting device geographically or in terms of network latency, throughput, etc., or which may have more spare capacity to serve the requesting device as compared to other edge servers, which may otherwise best serve the video to the requesting device, etc. However, depending upon the location of the requesting device, the access network utilized by the requesting device, and other factors, the chunks of the video may be delivered via various networks, various links, and/or various intermediate devices. For instance, in one example, edge server 174 may deliver video chunks to a requesting device in home network 160 via access network 120, e.g., an ISP network. In another example, edge server 174 may deliver video chunks to a requesting device in home network 160 via core network 110 and access network 120. In still another example, edge server 174 may deliver video chunks to a requesting device such as mobile device 157A or 157B via core network 110 and wireless access network 150.

In one example, a server, such as edge server 174, one of TV servers 112, etc., and a requesting device/client, such as STB/DVR 162A, PC 166, etc. may establish a transport layer connection, or session for video streaming. In one example, the transport layer session may include multiple streams, or may have at least one stream, and may selectively activate one or more additional streams to facilitate tail dropping and the use of partial chunks (e.g., including packets in flight before the server can act on an instruction to drop the tail). In another example, the server and client may utilize dual transport connections, or sessions, to enable the same or similar functionality.

It should also be noted that in accordance with the present disclosure, any one or more devices of system 100, such as one or more of application servers 114, TV servers 112, ingest server 172, edge server 174, one or more of servers 149, and so forth, may comprise a processing system to create video chunks for variants of ABR videos, and which, in one example, may have a designated order of intra-frame coded frames followed by inter-frame coded frames. In addition, any of the devices of system 100 that may comprise an adaptive bitrate streaming video player, such as STB/DVR 162A, STB/DVR 162B, TV 163A, TV 163B, PC 166, mobile devices 167A, 167B, 157A, and 157B, and so on, may also be configured to receive and play-out video chunks having frames reordered, as described herein.

Further details regarding the functions that may be implemented by application servers 114, TV servers 112, ingest server 172, servers 149, STBs/DVRs 162A and 162B, TV 163A, TV 163B, mobile devices 157A, 157B, 167A and 167B, and/or PC 166 are discussed in greater detail below in connection with the examples of FIGS. 2-6. In addition, it should be noted that the network 100 may be implemented in a different form than that which is illustrated in FIG. 1, or may be expanded by including additional endpoint devices, access networks, network elements, application servers, etc. without altering the scope of the present disclosure. For example, core network 110 is not limited to an IMS network. Wireless access network 150 is not limited to a UMTS/UTRAN configuration. Similarly, the present disclosure is not limited to an IP/MPLS network for VoIP telephony services, or any particular type of broadcast television network for providing television services, and so forth.

Figure 2:
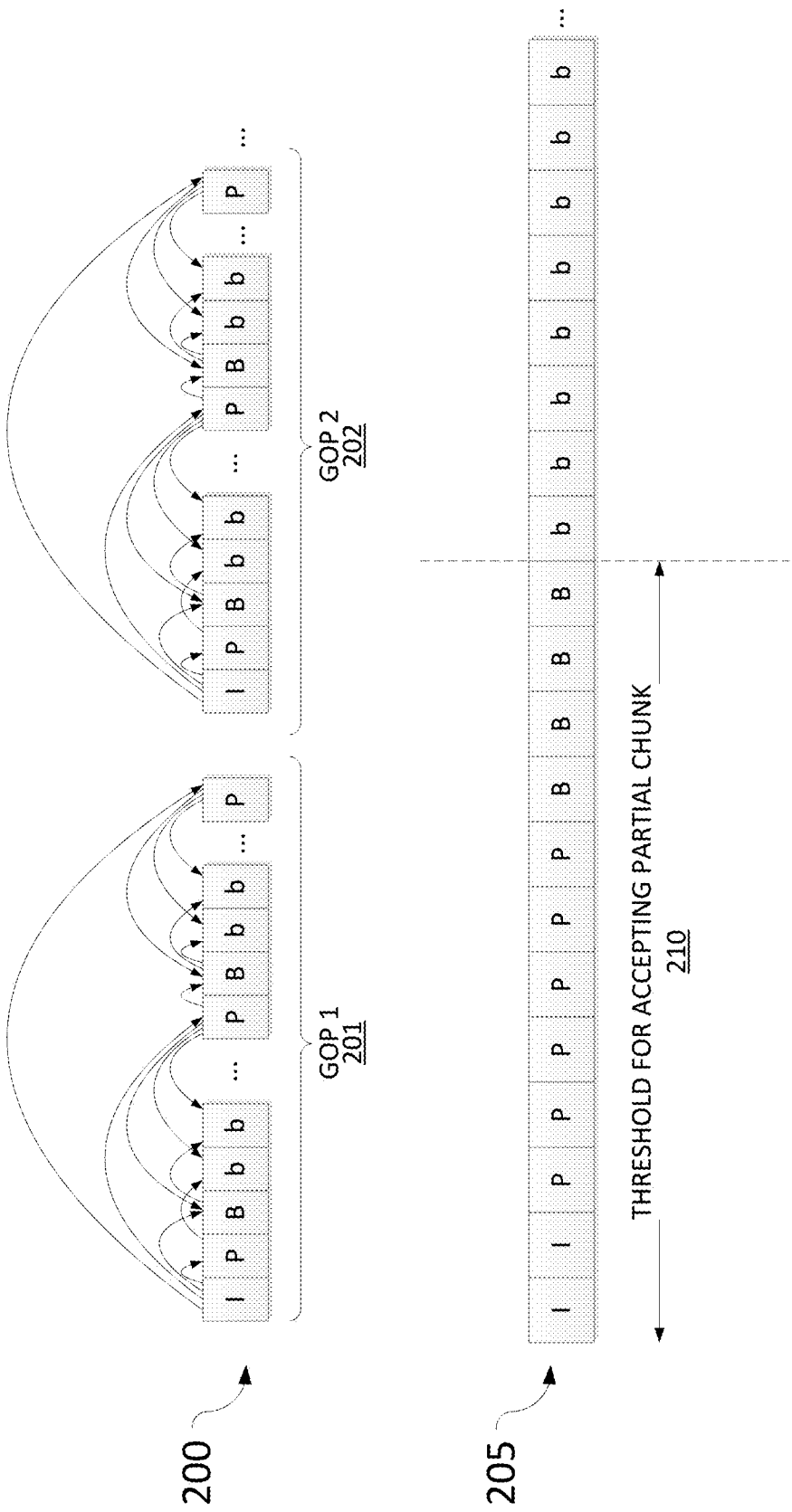
FIG. 2 illustrates an example frame ordering of a video chunk in accordance with the present disclosure.

Referring now to FIG. 2, in HEVC or AVC, the sequence of raw video frames (also called pictures) of a video are converted into coded bitstream and then transmitted over the network. An HEVC (or AVC) bitstream is structured into Network Abstraction Layer (NAL) units, which are essentially video packets that can be transmitted separately over the network and have a size less than the Maximum Transfer Unit (MTU) of the network. An encoded frame is placed into a single or multiple NAL units. The bitstream is converted back to raw pictures by the decoder before playback. There are two types of redundancies utilized by an encoder to perform video compression: spatial and temporal. Each raw frame is divided into blocks of pixels. The spatial redundancy refers to the intra-dependency among blocks within a frame, while the temporal redundancy refers to the inter-dependency among blocks across frames. The coded bitstream (e.g., following HEVC or AVC) is a sequence of Group of Pictures (GOPs), each comprising a number of coded frames. One or more GOPs form a unit of video, and more particularly in connection with adaptive bitrate schemes, a video chunk that is associated with a time block and encoded at a target bitrate (e.g., a video chunk of one of a plurality of variants). In accordance with the present disclosure, in one example, closed GOPs are used (with no temporal dependency across GOPs), since there may be switching between chunks of different variants from one time block to the next.

In HEVC or AVC, adaptive bitrate (ABR) rate control is employed to allocate bitrate to each frame in order to achieve an overall rate near a target bit rate, and at the same time maintain reasonable quality across frames. An encoded HEVC or AVC video is a series of GOPs. Encoding example 200 illustrates a frame structure for a video chunk comprising two GOPs, GOP 1 (201) and GOP 2 (202) in a particular frame order (broadly a first order). In one example, this frame order is a presentation order, i.e., an order in which the frames are temporally displayed. In another example, this frame order is an encoding order, i.e., an order in which the frames are encoded based on motion compensated prediction. Each GOP begins with an I-frame that is used to infer the P-frames and some B-frames within the GOP. An I-frame is strictly intra-coded, and provides a point in the video stream where a decoding can start without reference to any past or future frames. Following the I-frame, there is a series of PBb sequences (e.g., inter-coded frames). This sequence begins with a P-frame, and then a reference B-frame, followed by a sequence non-reference b-frames (denoted by 'b'). The number of consecutive non-reference b-frames could be anywhere between 1 and 16. In terms of temporal dependency, an I-frame is independent of all other frames, while a P-frame can depend on at most one other frame, which could be either an I-frame or a P-frame. A reference B-frame (or a non-reference b-frame) can depend on at most two other frames, which could be either an I-frame, a P-frame, or a B-frame. The relation among these frames is defined by the temporal coding property.

The frames of a video are transmitted in the encoding order as displayed in the encoding example 200. However, any corruption in the I-frames, P-frames, or (reference) B-frames will make a GOP non-decodable since these frames are needed to decode other frames. The corruption in any of the non-reference b-frames will not impact the decodability of other frames in a GOP, but will incur some trade-offs in terms of visual quality (e.g., in the temporal quality). In contrast, in one example, the present disclosure provides video chunks with a designated order (broadly a first order or a second order, depending upon whether the perspective is transmission or reception) reflecting the importance of frames in the decoding process. For instance, in one example, I-frames, P-frames, and (reference) B-frames of a video chunk are delivered first, followed by (non-reference) b-frames last. For example, all reference frames are delivered first before any non-reference frames will be delivered. This designated order is illustrated in the encoding example 205. It should be noted that all of the I-frames transmitted first may be I-frames from within one or more GOPs (e.g., from GOP 1 and GOP 2, in the present example), and similarly for the P-frames, B-frames, and b-frames. It should be understood that in other examples, a chunk may comprise a single GOP, or may comprise more than two GOPs, e.g., depending upon the duration of the time block associated with the chunk, the GOP length (e.g., the number of frames per GOP), the playback frame rate, and so on. In accordance with the present disclosure, this designated order may also be the order in which frames of a video chunk are stored. Thus, the video chunk may then be transmitted as per any HAS-based mechanism. Furthermore, at a client/playback device, the temporal order of playing the frames may be determined from a unique identifier (e.g., a Picture Order Count or POC in HEVC) that identifies the frames' positions in the display order, regardless of the designated order of frames as stored and/or transmitted over a network. Thus, the frame order (e.g., first order) of frame structure 205 is different from the frame order (e.g., second order) of frame structures 201 and 202.

In one example, the present disclosure guarantees the transmission of I-frames, P-frames, and B-frames, and transmits as many b-frames as the bandwidth allows. Thus, video for all time blocks will be decodable (e.g., avoiding playback stalls due to decoding issues). Examples of the present disclosure may also be used in conjunction with other techniques, such as bandwidth estimation-based rate switching or buffer depletion-based rate switching. For instance, in one example, if at least all of the I-frames, P-frames, and B-frames are received, the player may accept a partial chunk for a current time block when a timeout is reached and move on to a next time block, while a quality level (bitrate variant level) of a chunk for the next time block may be dynamically adjusted according to a current bandwidth estimate. An example threshold 210 for accepting a partial chunk is illustrated in FIG. 2. Notably, the threshold 210 establishes that if all of the I-frames, P-frames, and B-frames (broadly all reference frames) are received, then the player may playback the video chunk for the time block with zero or as many of the b-frames as may be received (e.g., before a timeout).

It is noted that the size of each video chunk varies even for a same target bitrate (e.g., chunks for the same variant and/or encoding level but for different time blocks may have different actual bitrates), even though all chunks represent the same playback duration. For instance, a per-chunk bitrate may vary between 1.8 Mbps and 12.69 Mbps, and the transmission time may vary from 0.7 seconds to 4.91 seconds if 5.3 Mbps is the average available bandwidth. A similar trend is observed for other videos, though the extent of variation differs across videos. In one example, the present disclosure defines a per-chunk timeout ($t_i$) value that is calculated based on the actual chunk size ($s_i$) and the estimated bandwidth ($b_i$) at the time that the chunk is to be transmitted, e.g., $t_i=s_i/b_i$. The per-chunk timeout allows the player to check on the status of the video chunk transmission to detect if bandwidth is falling below the estimate.

Examples of the present disclosure may trade b-frames for flexibility. However, the missing frames may be recovered to restore the original frame rate. In one example, any missing b-frames may be replaced with the frame before it (which is more visually appealing than presenting a blank frame). For instance, it is observed that a missing b-frame generally has a high degree of similarity with the b-frame before it. Notably, in each PBb sequence for example, there may be up to 16 b-frames. It may be a concern to replicate all 16 b-frames with the same frame, which may appear as a stall during playback. For instance, for a 2-second segment of a 30 frames per second (fps) video, each frame represents approximately 0.03 seconds. In one extreme example, if at most one b-frame in each PBb/GOP sequence is lost, recovering the missing frame with duplication from the previous frame will not be noticeable. In the other extreme example, if up to 16 consecutive b-frames in each PBb/GOP sequence is lost, the proposed recovery technique may result in a noticeable perception of stalls. In one example, the order of storage and/or transmission of b-frames of a video chunk is shuffled (e.g., randomly) to reduce the chance of consecutive b-frames being dropped. In particular, the b-frames at the end of the video chunk are the most likely to be dropped, but the actual order of playback of such b-frames are scattered throughout the video chunk. Hence, the random shuffle may space out the missing frames to allow better motion continuity during playback of a partial video chunk.

It should also be noted that although some examples of the present disclosure relate to an AVC or HEVC scheme with I-frames, P-frames, reference B-frames, and non-reference b-frames, the present disclosure is equally applicable to other video coding schemes with inter-frame coded frames and intra-frame coded frames. For example, the arrows between frames in the encoding example 200 are provided for illustrative purposes only and do not preclude various other types of inter-frame coding/frame dependencies. For instance, another coding scheme may exclude reference bidirectional coded frames. Still another coding scheme may include non-reference frames which depend from two or more other frames, but which are not necessarily "bidirectional" (e.g., dependent on other frames which both precede and follow the frame), and so on.

In one particular example, the present disclosure may utilize an encoding protocol using forward encoding (non-bidirectional), such as AV1. In AV1, nearly all frames are reference frames, and hence AV1 does not readily allow for frame reordering, such as for AVC and HEVC as described above.

Nevertheless, the advantages of tail dropping/acceptance of partial chunks in the face of deteriorating network bandwidth conditions, buffer depletion, and so forth may still be further enhanced via the ability to use in flight packets as described herein (e.g., using multiple streams in a single connection and/or using dual connections).

Figure 3:
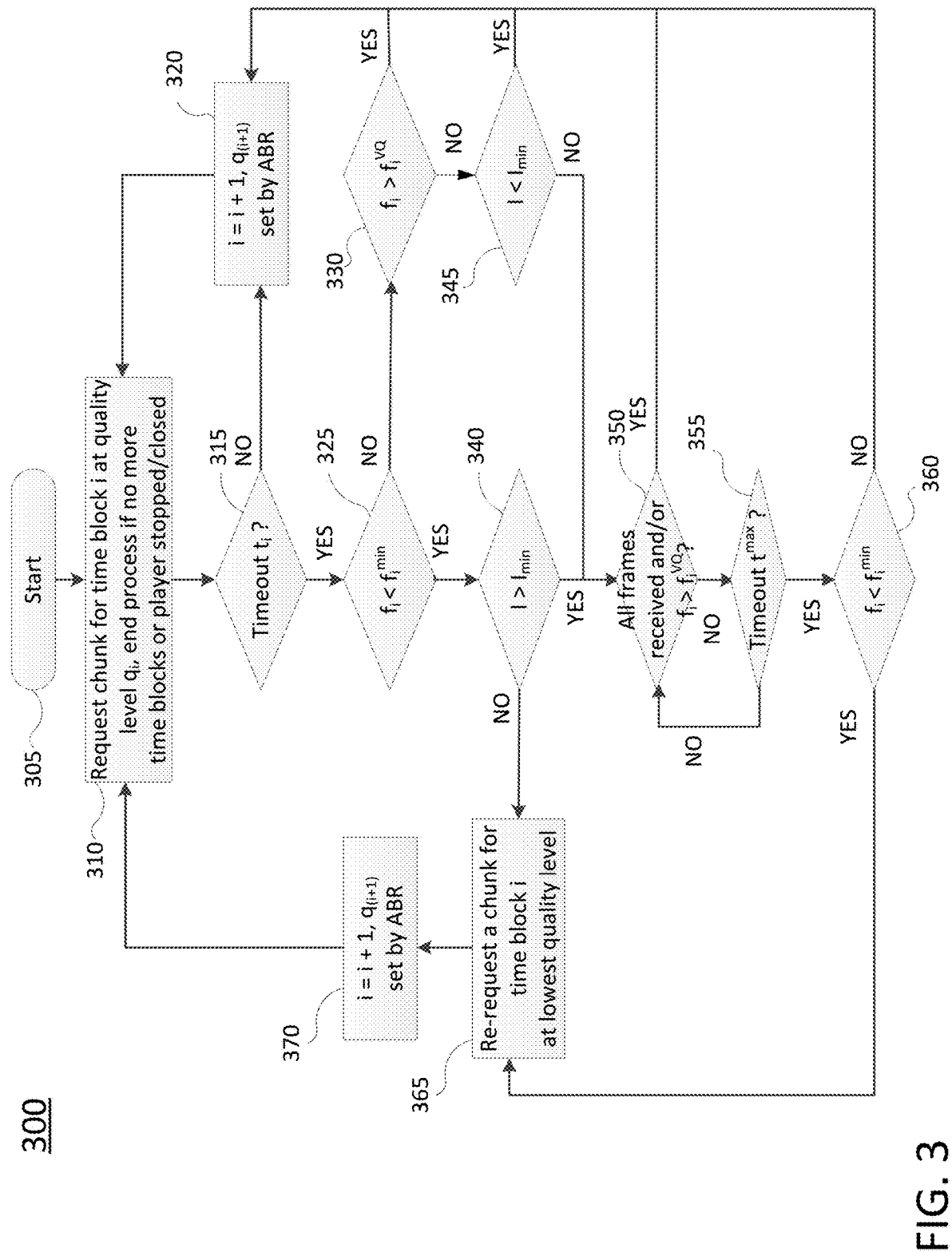
FIG. 3 illustrates a flowchart of an example of processing a partial chunk, in accordance with the present disclosure.

FIG. 3 illustrates an example process 300 for processing partial chunks in accordance with the present disclosure. The process 300 may be performed by an ABR video player/client device, such as, STB/DVR 162A, STB/DVR 162B, one of the TVs 163A or 163B, PC 166, one of the mobile devices 157A, 157B, 167A, or 167B of FIG. 1, and so forth. The process 300 may begin at stage 305 and proceed to stage 310 where the client device may request a first chunk for a first time block i at a quality level $q_i$. It should also be noted that although the terms, "first," "second," "third," etc., may be used herein, the use of these terms are intended as labels only. Thus, the use of a term such as "third" in one example does not necessarily imply that the example must in every case include a "first" and/or a "second" of a similar item. In other words, the use of the terms "first," "second," "third," and "fourth," does not imply a particular number of those items corresponding to those numerical values. In addition, the use of the term "third" for example, does not imply a specific sequence or temporal relationship with respect to a "first" and/or a "second" of a particular type of item, unless otherwise indicated. Similarly, as referred to herein, the term "first" is used simply as a label and does not imply that a segment or chunk necessarily relates to a beginning segment of a video (although in one example it could be).

In any case, at stage 310 the player may request a video chunk for each time block i at the quality level $q_i$ in accordance with an estimated bandwidth and/or a buffer occupancy level. At stage 315, the player determines if the video chunk for time block i is received before a per-chunk timeout $t_i$. It should be noted that there is variation in the size and/or bandwidth of video chunks from one time block to another time block, even within a same target bitrate of the ABR scheme. Thus, in one example, each chunk may have its own per-chunk timeout $t_i$, which in one example may be obtained by the player from a manifest file for the video. In one example, the per-chunk timeout $t_i$ is calculated based on the actual chunk size ($s_i$) and the estimated bandwidth ($b_i$) at the time that the chunk is to be transmitted, e.g., $t_i=s_i/b_i$. If the video chunk for time block i is received before the per-chunk timeout $t_i$, the player moves on to stage 320 to determine the quality level $q_{(i+1)}$ for a video chunk for a next time block i+1. From stage 320, the player returns to stage 310 to request the video chunk for the next time block i+1 at the quality level that is determined at stage 320. However, if there are no more time blocks, or if the video player is stopped, paused, closed, etc., the process 300 may end.

On the other hand, if at stage 315 it is determined that the video chunk for time block i is not received before the per-chunk timeout $t_i$, it means that the actual bandwidth is lower than the estimated bandwidth, causing partial delivery of the chunk by the time of the per-chunk timeout $t_i$. There are three possible cases, depending on the number of frames successfully received (denoted by fi) and the relation to a minimum number of frames (denoted by $f_i^{min}$) and/or a per-chunk loss tolerance level ($f_i^{VQ}$). With respect to AVC, HEVC, or the like, $f_i^{min}$ may comprise the number of reference frames (e.g., I-frames, P-frames, and B-frames) in the chunk. For AV1 or the like, $f_i^{min}$ may comprise a fixed percentage such as 75 percent of the chunk, 80 percent of the chunk, or the like. In one example, such as for AV1, $f_i^{min}$ and $f_i^{VQ}$ may be the same (or the use of one of these may be omitted).

At stage 325, the player may determine whether $f_i<f_i^{min}$: which in one example, may comprise determining whether the number of frames successfully received is less than the number of reference frames within the chunk, which may be the same as or similar to the threshold 210 of FIG. 2). For HEVC or AV1, if $f_i<f_i^{min}$, the video chunk is not completely decodable. It should be noted that it may still be possible to play-out the video chunk by recreating missing frames with only the portion of the reference frames that are received. However, for illustrative purposes, it is assumed that given the balance of the number of reference frames versus non-reference frames within each chunk, using only a portion of the reference frames would result in such a poor visual quality such that the partial chunk should not be used.

If $f_i<f_i^{min}$, the player may proceed to stage 340 and determine whether the buffer occupancy level l is healthy, i.e., whether $l>l_{min}$, where $l_{min}$ is a buffer occupancy threshold/minimum buffer occupancy level. If $l>l_{min}$, the player may proceed to stages 350 and 355 and continue to wait to receive more frames of the video chunk for segment i. Otherwise, if the buffer occupancy level is already depleted, e.g., at or below $l_{min}$, the current chunk for time block i may be aborted (if the chunk is not of the lowest quality level available). As illustrated in FIG. 3, the player may proceed to stage 365 to re-request a different chunk for the same time block i, but at the lowest available quality level. Following stage 365, at stage 370, the player may determine a quality level $q_{(i+1)}$ for a video chunk for a next time block i+1 according to the ABR scheme, e.g., in accordance with the currently estimated network bandwidth and/or the buffer occupancy level l.

Referring again to stages 350 and 355, the player may wait to receive additional frames of the video chunk for time block i. It is possible that more than the minimum number of frames (e.g., $f_i^{min}$, which may denote a decodability threshold comprising all of the reference frames) has been received such that the video chunk is decodable. However, for HEVC and AVC, in the case that all reference frames are received but some b-frames are still missing, the video chunk may be partially decodable, but with noticeable loss in visual quality. Also, the impact level may vary among video chunks. In one example, the present disclosure provides a loss tolerance level, defined as $f_i^{VQ}$, to balance visual quality with visual stability (e.g., maximize peak signal to noise ratio (PSNR) and structural similarity (SSIM) values while minimizing stalls and switches).

In one example, a uniform loss tolerance level may be applied (e.g., between 10 and 30 percent of b-frames, such as 20 percent). However, since the tolerance level varies from chunk to chunk, in one example, a per-chunk loss tolerance level is defined, where $f_i^{VQ}$ may be set according to a motion activity (MA) measure between the GOPs of the video chunk. To illustrate, for high MA (e.g., greater than 0.5), the loss tolerance level may be 20 percent, for example, whereas for low MA, e.g., less than 0.08, the loss tolerance level may be as high as 80 percent, for example. In one example, for MA values between these two extremes, the per-chunk loss tolerance level may be a percentage between 20 and 80. In one example, the possible per-chunk loss tolerance levels may be linearly scaled between these extremes. In another example, the possible per-chunk loss tolerance levels may be stepwise linearly scaled, and so forth.

If all of the frames are received, or if $f_i > f_i^{VQ}$, before a maximum wait time (timeout $t^{max}$), the player may accept the chunk and proceed to step 320. Otherwise, if the timeout $t^{max}$ is reached before all frames of the chunk are received, the player may proceed to stage 360. At stage 360, the player may determine whether the number of frames received f is still less than $f_i^{min}$, e.g., the number of reference frames of the chunk. If $f_i < f_i^{min}$, the player may proceed to stage 365 to re-request a different chunk for time block i at the lowest available quality level. Otherwise, if $f_i > f_i^{min}$, the player may accept the (partial) video chunk and proceed to stage 320 to request a video chunk for a next time block i+1 at a quality level $q_{(i+1)}$ according to the ABR scheme.

Referring again to stages 325 and 330, it is possible that more than the minimum number of frames (e.g., $f_i^{min}$, which in the examples of HEVC and AVC may denote all of the reference frames) has been received such that the video chunk is partially decodable. However, in the case that all reference frames are received but some b-frames are still missing, the segment may be decodable, but with varying degrees of noticeable loss in visual quality. Accordingly, at stage 330, the player may determine whether the number of frames received $f_i$ exceeds the number of frames denoting a minimum expected visual quality $f_i^{VQ}$: that is, whether $f_i > f_i^{VQ}$. If true, the partial chunk may be accepted by the player. It should be noted that the determination at stage 330 is equally applicable to examples of HEVC, AVC, AV1, and so forth. The player may then proceed to stage 320 to request a video chunk for a next time block i+1 at a quality level $q_{(i+1)}$ determined according to the ABR scheme.

In the example of FIG. 3, if the player determines at stage 330 that $f_i < f_i^{VQ}$, the player may proceed to stage 345. At stage 345, the player may determine if the buffer occupancy level l is not below $l_{min}$. If $l > l_{min}$, the player may proceed to stage 350 to determine whether all frames are received and/or the number of frames received $f_i$ exceeds the number of frames to provide the expected visual quality $f_i^{VQ}$. If $f_i > f_i^{VQ}$, the player may proceed to stage 320 as described above. Otherwise, the player may continue to receive frames until all frames are received, $f_i > f_i^{VQ}$, or the timeout $t^{max}$ is reached in stages 350 and 355.

As compared to other bitrate adaptation methods, the process 300 is more aggressive in moving along to a chunk for a next time block. However, the overall visual quality and stability throughout the streaming session is improved.

It may be noted that choosing the quality of the next chunk to be downloaded for the next time block is based on the default adaptation algorithm running at the client. Hence, the present process 300 may work along with the existing adaptation algorithm(s) in an HAS-based client. It should also be noted with respect to HEVC and AVC that for certain ABR quality levels, a percentage of b-frames (e.g., up to 40% of b-frames) may be lost while still maintaining a higher visual quality than a next lower quality level. Thus, examples of the present disclosure may allow the use of less ABR quality levels than other schemes. For instance, one or more intermediate quality levels may be eliminated, where an equivalent or similar visual quality may be provided by obtaining partial chunks of a higher bitrate/encoding level (quality level). Although the network bandwidth may not support the obtaining of full chunks at the higher quality level, partial chunks of a sufficient percentage of b-frames may be obtained in a steady state which may provide an average visual quality that is similar to that of an eliminated quality level. In addition, the use of partial chunks in accordance with the present disclosure allows for a more continuous range of visual qualities to be obtained, with less switching between discrete bitrates/encoding levels and a better overall quality of experience to end users.

In accordance with the present disclosure, aspects of the process 300 of FIG. 3 may further account for the use of in-flight packets, as described herein. For instance, $f_i$ may alternatively be defined as the number of frames received plus a number of frames expected to be received based upon an estimate of a number of packets in-flight and/or to be in-flight before the server can stop transmitting for the current chunk and begin transmitting for the video chunk for the next time block i+1. Alternatively, or in addition, aspects of the process 300 that utilize $f_i$ may substitute $f_i$ with $(f_i + f_e)$, where $f_e$ is the estimated number of frames in flight and/or to be in flight and to still be received. Thus, at stage 330, the player may determine whether the number of frames received plus the estimated number of in-flight frames satisfies the minimum expected visual quality $f_i^{VQ}$. In addition, stage 350 may similarly consider the number of frames received plus a number of frames expected to be received according to the alternate definition of $f_i$ or $(f_i + f_e)$.

It should be noted that although the process 300 is described above primarily in connection with examples of HEVC and AVC (e.g., with frame reordering), in one example, the process 300 is equally applicable to AV1 or other video encoding types. In one example, a streamlined version of the process 300 may be employed, which may be particularly suited for use in connection with AV1, but which may also be applicable to examples of HEVC, AVC, or the like. For instance, AV1 may allow less tail dropping as compared to HEVC and AVC (e.g., up to around 20 percent versus 40 percent or more). Thus, in one example, it may be considered that any number of frames received (and or received plus in flight) that exceeds 80 percent of the total number of frames of the chunk may be accepted. To illustrate, instead of using both $f_i^{min}$ and $f_i^{VQ}$, a single threshold for accepting a partial chunk may be utilized. In such case, when timeout $t_i$ is reached, the player may determine whether the number of frames received, and/or the number or frames received plus an estimated number of frames in flight exceeds a threshold for accepting the partial chunk. In one example, the player may simply drop the tail and move on to the next chunk (while still receiving and utilizing any packets in flight). For instance, the player may instruct the server to stop sending packets for the chunk for time block i on stream 1 and to start sending packets for a chunk of time block i+1 via stream 2 (e.g., where stream 1 and stream 2 are part of a same transport connection). In another example, the player may also consider the buffer occupancy. For instance, if $l>l_{min}$, the player may continue to wait for packets to arrive and for bandwidth to possibly recover. However, if $t_{max}$ is reached, if $l<l_{min}$, or both occur before all frames of the chunk for time block i arrive, the player may then determine whether to re-request a chunk for time block i at the lowest quality level, or to accept the partial chunk (e.g., when $f_i$ or ($f_i+f_e$) is greater than the threshold for accepting the partial chunk ($f_i^{min}$ or $f_i^{VQ}$).

Figure 4:
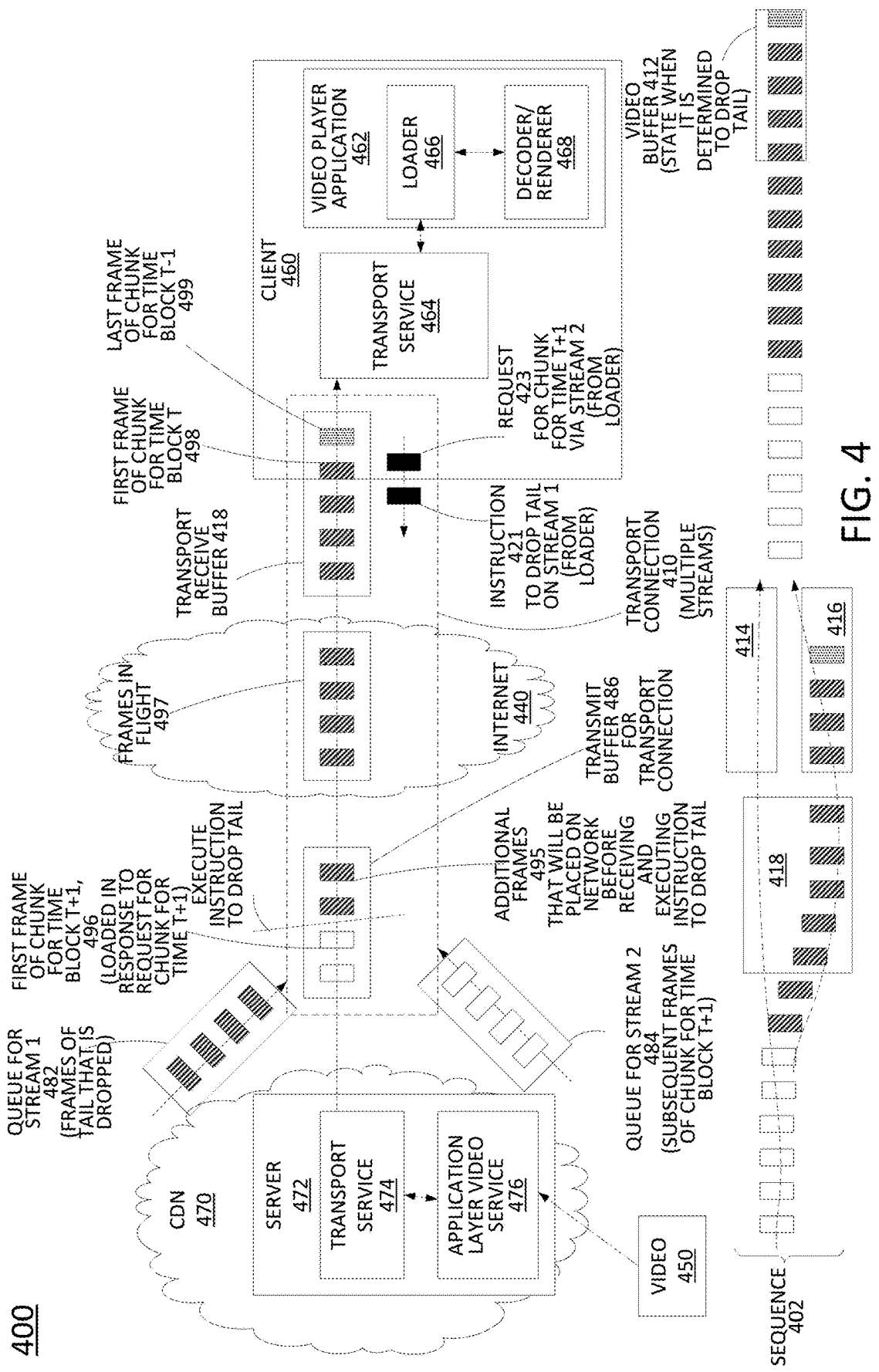
FIG. 4 illustrates an example system for adaptive bitrate video streaming with dual streams, in accordance with the present disclosure.

FIG. 4 illustrates an example system 400 for ABR video streaming with dual streams in accordance with the present disclosure. As illustrated in FIG. 4, the system 400 includes a CDN 470 comprising a server 472 (e.g., an edge server), a client 460 (or "client device"), and Internet 440 (broadly, one or more networks). These components may be the same or similar to counterparts illustrated in FIG. 1 and discussed above. Server 472 may include an application layer video service 476 and a transport service 474 (e.g., a QUIC service). Server 472 may store a video 450, which in one example may comprise several variants, wherein each time block of the video may have several chunks of different variants encoded at different bitrates. Client 460 includes a transport service 464 (e.g., a QUIC service) and a video player application 462 (e.g., an ABR/HAS video player). The video player application 462 may include a loader module 466 responsible for obtaining and buffering frames of the video 450 as received from server 472, and a decoder/renderer 468 for reconstructing final versions of frames (e.g., using inter-frame data according to the encoding scheme of video 450).

Video player application 462 may request chunks of the video 450 from application layer video service 476 of server 472 according to a manifest file of video 450, which may identify the different variants available, and how/where to obtain chunks of different variants for various time blocks of the video 450. In the present example, all of the chunks may be made available via server 472 according to the manifest file. However, in other examples, chunks for various time block and/or for different variant may be obtainable via different servers according to the manifest file, according to a redirection based upon a load balancing scheme (e.g., according to a Domain Name System (DNS) based load balancing, or the like), etc. In the example of FIG. 4, the video player application 462 and application layer video service 474 may establish a transport connection 410, which on one example may be in accordance with the QUIC protocol, via respective transport services 464 and 474.

As illustrated in FIG. 4, at some point during the streaming of video 450, the client 460 may have a number of frames in video buffer 412 at a time when it may be determined by the video player application 462 that there is a risk of a stall, e.g., when a timeout for downloading the chunk for time block T is exceeded. For instance, the video buffer 412 may include a last frame of a chunk for time block T−1, a first frame of a chunk for time block T 498, and a number of subsequent frames for the chunk of time block T. In this case, the video player application 462 may cause an instruction 421 to be transmitted to server 472 to drop the tail of the chunk for time block T. For instance, it may be determined that the number of frames for time block T already received and/or in video buffer 412, or the number of frames for time block T already received plus an estimate of a number of frames in flight 497 exceeds a cutoff (e.g., a visual quality threshold, such as described above, or the like). In one example, the instruction may be sent via a first stream of the transport connection 410, which may be received by the transport service 474, and which may cause the transport service 474 to stop transmitting frames (e.g., packets comprising the frames) of the chunk for time block T. In the example of FIG. 4, by the time the transport service 474 is able to receive and execute the instruction, additional frames 495 in a transmit buffer 486 may be placed onto the network and which may follow behind the frames in flight 497.

The video player application 462 may also transmit a request 423 for a new chunk for time block T+1 via a second stream (stream 2) of the transport connection 410. In one example, stream 2 may already be instantiated, but idle and waiting for use. In another example, server 472 may receive the request 423 and may cause server 472, e.g., via application layer video service 476, to instantiate and/or activate a new stream (stream 2).

Thus, by the time server 472 is able to stop transmitting for stream 1 and to load and begin transmitting frames of the next chunk for time T+1 from stream 2, in the example of FIG. 2, two additional frames 495 may be placed in flight from the transmit buffer 486. Behind these additional frames 495, the server 472 (e.g., via transport service 474) may load the first chunk for time block T+1 (496) and subsequent chunks thereafter from the queue for stream 2 (484). For instance, the queues for streams 1 and 2 (482 and 484) may be application layer queues that feed frames to transport service 474 for being packetized, placed in transmit buffer 486, and transmitted. It should be noted that in accordance with QUIC, different streams may both be active and provide data to be conveyed over the transport connection 410. However, in accordance with the present disclosure, it is intended that server 472 stops transmitting frames of the chunk for time T as soon as possible after receiving instruction 421, and to begin transmitting frames of the chunk for time T+1 as soon as possible after receiving request 423, but without overlap.

Nevertheless, in accordance with the present disclosure, client 460 (and server 472) may keep stream 1 open for some period of time to allow the packets in flight 497 (and including the additional frames 495 that are placed on the network) to still be received into the buffer 412 and used for playback. Transport service 464 may receive packets for both streams into transport receive buffer 418 and demultiplex packets for different streams (streams 1 and 2) as further illustrated in sequence 402. For instance, sequence 402 illustrates that all frames packetized and transmitted by the server 472 (ignoring any packet loss in the network, e.g., internet 440) are received into transport receive buffer 418 upon which the transport service 464 may segregate the frames (e.g., the packets comprising the frame data) into an application layer receive queue/buffer 414 for stream 1 and an application layer receive queue/buffer 416 for stream 2, respectively. However, loader 466 may effectively receive the packets (e.g., comprising frames or portions of frames) for both streams via receive queues/buffers 414 and 416, and place all such frames in the playback queue/video buffer 412 from which decoder/renderer 468 may render playback versions of frames for display. In one example, after the first packet for the chunk for time T+1 is received, client 460 may cause stream 1 to be closed by sending a further instruction to server 472. In another example, stream 1 may remain open, but inactive, and ready for potential use in connection with another instance of tail dropping/accepting a partial chunk and making use of frames in flight. For instance, client 460 may determine to drop the tail of a chunk being received in stream 2 (which may be active) and may request the server 472 to begin transmitting a next packet on stream 1 in a similar manner as described above.

FIG. 5 illustrates a flowchart of a method 500 for receiving and playing frames of a video chunk transmitted by a source device after the sending and prior to the receiving of an indication to stop transmitting additional frames of the video chunk, in accordance with the present disclosure. In one example, the method 500 is performed by an ABR video player/client device, e.g., STB/DVR 162A, STB/DVR 162B, one of the TVs 163A or 163B, PC 166, one of the mobile devices 157A, 157B, 167A, or 167B, and so forth, or any one more components thereof, such as a processing system, or by one of these devices in conjunction with other devices and/or components of network 100 of FIG. 1. In one example, the steps, functions, or operations of method 500 may be performed by a computing device or system 600, and/or a processing system 602 as described in connection with FIG. 6 below. For instance, the computing device 600 may represent any one or more components of a client device that is/are configured to perform the steps, functions and/or operations of the method 500. For illustrative purposes, the method 500 is described in greater detail below in connection with an example performed by a processing system, such as processing system 602. The method 500 begins in step 505 and may proceed to optional step 510 or to step 520.

At optional step 510, the processing system may transmit a request for a first video chunk of a video, where the first video chunk is associated with a first time block of the video and is encoded at a first bitrate of a plurality of available bitrates of the video. For instance, the video may be available as an ABR video and may be in a HEVC encoding format, an AVC encoding format, an AV1 encoding format, etc. The request may be transmitted to a source device, e.g., a server from which the video, or at least a portion thereof, may be streamed/downloaded. For example, the processing system may request the first video chunk in accordance with a URL or other identifier(s) of the second video chunk from a manifest file or the like for the video.

The first bitrate, and hence the first video chunk, may be selected via a channel capacity estimation-based approach, a buffer occupancy-based approach, a hybrid approach, etc. It is again noted that although the terms, "first," "second," "third," etc., may be used herein, the use of these terms are intended as labels only. Thus, the term "first" is used simply as a label and does not imply that the first video chunk and the first time block necessarily relate to the initial time block of a video (although in one example it could be). In one example, optional step 510 may comprise establishing a first transport connection. In one example, optional step 510 may further include establishing at least a first stream via the first transport connection. For instance, the first transport connection may comprise a QUIC connection, or QUIC protocol connection (Quick UDP Internet Connections protocol connection) and the first stream may comprise a QUIC stream. Accordingly, in one example, the request for the first video chunk may be transmitted via the first transport connection and/or the at least the first stream thereof.

At step 520, the processing system determines a risk of stall condition of a playback of the video, where the risk of stall condition is determined during a downloading of the first video chunk associated with the first time block of the video from a source device (i.e., the downloading/receiving of some frames and the playback of other frames are occurring simultaneously or nearly simultaneously). For instance, the risk of stall condition may be a passing of a timeout period, or deadline to download the first chunk without receiving all frames/packets of the first chunk, a decrease in a video buffer occupancy below a threshold, e.g., below 25 percent, below five seconds of video time, etc., a combination thereof, and so forth. The timeout period may comprise for example, a per-chunk timeout, a maximum timeout, or the like, such as discussed above in connection with the example of FIG. 3.

In one example, the downloading may comprise receiving the first plurality of frames of the first video chunk from the source device in response to the request for the first video chunk of optional step 510. In one example, step 520 may include recording the first plurality of frames in a video buffer. The video buffer may comprise a portion of a memory of a device of the processing system, or may be otherwise associated with the processing system. The frames may be recorded in the video buffer in the order received, or may be reordered in an order for presentation/playback. For instance, each frame may be tagged with a frame number indicating the frame's order or position within a sequence of frames, e.g., within the video chunk or time block, and/or within the overall video. In one example, video chunks of the video including the first video chunk (and including the first plurality of frames thereof) are encoded according to an encoding protocol using forward encoding (e.g., non-bidirectional, forward encoding). For instance, video chunks of the video including the first video chunk may be encoded according to an AV1 protocol.

In another example, video chunks of the video including the first video chunk may be encoded according to an encoding protocol using bidirectional interframe encoding, where frames of the first video chunk including the first plurality of frames may be received from the source device in an order in which non-reference bidirectional predicted frames of the video chunk are transmitted after other frames of the video chunk. For instance, the first video chunk (including the first plurality of frames thereof) may be encoded according to AVC, HEVC, or the like. In one example, the first plurality of frames may comprise a plurality of intra-frame coded frames and a plurality of inter-frame coded frames. For instance, and the first plurality of frames may be received from the source device in a designated order comprising the plurality of intra-frame coded frames (e.g., I-frames) followed by the plurality of inter-frame coded frames. In one example, the plurality of inter-frame coded frames comprises a plurality of forward predicted frames (e.g., P-frames) and a plurality of bidirectional predicted frames. In addition, in one example, the plurality of bidirectional predicted frames may comprise a plurality of reference bidirectional predicted frames (e.g., B-frames) and a plurality of non-reference bidirectional predicted frames (e.g., b-frames). The designated order may further comprise, among the plurality of inter-frame coded frames, the plurality of forward predicted frames, followed by the plurality of reference bidirectional predicted frames, followed by the plurality of non-reference bidirectional predicted frames. In one example, the designated order may further include a random order among the plurality of bidirectional predicted frames of the video chunk.

At step 530, the processing system determines, in response to the risk of stall condition, that a number of a first plurality of frames of the first video chunk received from the source device exceeds a threshold. The threshold number of frames may comprise a number of reference frames within the video chunk (e.g., $f_i^{min}$, as discussed above in connection with the example of FIG. 3, and which may be the same as or similar to the threshold 210 of FIG. 2) or may comprise a visual quality threshold, or per-chunk loss tolerance level (e.g., $f_t^{VQ}$, as discussed above in connection with the example of FIG. 3) to provide, at a minimum, a particular video quality level. In one example, the threshold may comprise a static and/or a universally applicable threshold (e.g., for the particular video, for videos of a particular encoding type (e.g., all AV1 videos), etc.), such as 80 percent of the chunk, 85 percent of the chunk, etc. In other words, step 530 may comprise a positive determination to drop a tail of the first video chunk, i.e., to accept a partial chunk and to move on to a chunk for a next time block of the video. In one example, step 530 may include estimating a number of frames and/or packets in flight, and determining the risk of stall condition while further accounting for such potential frames and/or packets in flight. Alternatively, or in addition, the threshold may be set based upon an expectation or assumption of a number of packets and/or frames that may be in flight.

At optional step 540, the processing system may determine a first video quality associated with the number of the first plurality of frames that are received. In one example, step 540 may be performed in accordance with a mapping of a number of frames received and/or dropped, and/or a percentage of frames received and/or dropped, to a video quality (e.g., a "visual quality"), as described above.

At optional step 550, the processing system may determine whether the first video quality is higher or lower than a second video quality associated with a lower bitrate of an adaptive bitrate streaming protocol as compared to the first bitrate of the first video chunk. In one example, step 550 may be performed in accordance with a mapping of bitrates to video quality metrics.

At step 560, the processing system transmits a request for a next video chunk associated with a next time block of the video following the first time block, and an indication to the source device to stop transmitting additional frames of the first video chunk, in response to determining that the number of frames exceeded the threshold. For example, the processing system may request the next video chunk in accordance with a URL or other identifier(s) of the next video chunk from a manifest file or the like for the video.

In one example, the next video chunk may be requested having a same first bitrate as the first video chunk when the first video quality is higher than the second video quality, or may be requested having the lower bitrate when the first video quality is lower than the second video quality. For example, the present disclosure may allow the repeating/ongoing use of partial chunks which may provide a visual quality/video quality that exceeds that of the next lower bitrate. However, if too much of the end of the video chunk is being dropped based upon the timeout(s), the visual quality may drop below that which can be obtained. In such case, the processing system may decide to change to the (next) lower bitrate for the next video chunk for the next time block.

In one example, the request may be transmitted via a second stream of a first transport connection (e.g., where the first plurality of frames of the first video chunk may be received via a first stream of the first transport connection). For instance, as noted above, the first transport connection may comprise a QUIC connection that supports multiple simultaneous streams. In accordance with the present disclosure, a second stream may be used to begin receiving frames of the next video chunk, while keeping the first stream open to continue to receive frames (and/or or packets comprising the frames) of the first video chunk that are in flight. In one example, the request for the next video chunk associated with the next time block of the video establishes the second stream. In another example, the second stream may already be established and ready waiting for use.

In this regard, it should be noted that in one example, the indication to stop transmitting additional frames of the first video chunk and the request for the next video chunk may comprise separate messages. In such case, the indication may be sent via the first stream and the request may be transmitted via the second stream. However, in another example, the indication and the request may be separate messages that are sent via the first stream, which may cause the source device to open the second stream and/or to use an existing second stream. In still another example, the indication and the request may be part of the same message that is transmitted via the first stream, or that is transmitted via the second stream that is already open, but which may be inactive. For instance, in examples where the request and the indication are separate messages or part of the same message, if second stream is open, the request and indication may both be sent via the second stream, which may cause the source device to stop transmitting on first stream and to begin transmitting on second stream.

At step 570, the processing system receives a second plurality of frames of the first video chunk from the source device, where the second plurality of frames of the first video chunk were transmitted by the source device prior to receiving the indication to stop transmitting the additional frames of the first video chunk. For instance, the second plurality of frames may comprise packets that were in-flight and those that may be placed in-flight before the source device receives and acts upon the indication to stop transmitting additional frames of the first video chunk. In one example, step 570 may comprise receiving the second plurality of frames of the first video chunk via the first stream (e.g., the same stream over which the first plurality of frames of the first video chunk are received). In one example, step 570 may include recording the first plurality of frames in the video buffer.

At step 580, the processing system receives a first plurality of frames of the next video chunk (e.g., that are transmitted by the source device in response to the request for the next video chunk). In one example, the first plurality of frames of the first video chunk and the second plurality of frames of the first video chunk are received via a first stream, and the first plurality of frames of the next video chunk is received via a second stream. In addition, in one example, the first stream and the second stream may be part of a first transport connection. For instance, as noted above, the first transport connection may comprise a QUIC connection.

At step 590, the processing system plays the first plurality of frames of the first video chunk, the second plurality of frames of the first video chunk, and the first plurality of frames of the next video chunk. In one example, step 590 may comprise playing the first plurality of frames of the first video chunk and the second plurality of frames of the first video chunk when it is determined that the threshold number of frames is received (i.e., accepting a partial chunk, including packets in flight). In one example, step 590 may comprise accessing and rendering the frames from a video buffer of the processing system. For instance, the processing may comprise a display screen or may transmit the plurality of frames to a display screen for playback/presentation. In one example, step 590 may include substituting prior frames for any missing frames. In one example, step 590 may comprise determining a temporal sequence of frames for presentation/playback, and playing the frames in such order. For instance, in one example, the frames may be maintained in the video buffer in a designated order in which the frames are received, rather than the presentation order (e.g., for AVC, HEVC, or the like). In one example, all, or one or more aspects of step 590 may be performed before, during, or simultaneous with other steps of the method 500. For example, the processing system may first play-out frames from an earlier video chunk before playing-out the first plurality of frames of the first video chunk, the processing system may begin playing-out the first plurality of frames of the first video chunk before the second plurality of frames of the first video chunk are received and/or before the first plurality of frames of the second video chunk are received, etc.

Following step 590, the method 500 may proceed to step 595 where the method ends.

It should be noted that the method 500 may be expanded to include additional steps, or may be modified to replace steps with different steps, to combine steps, to omit steps, to perform steps in a different order, and so forth. For instance, in one example the processor may repeat one or more steps of the method 500 by returning to step 510 or step 520 after step 590 and/or while step 590 is performed on an ongoing basis. In one example, step 520 may alternatively or additionally include detecting a drop in a network bandwidth between the processing system and the source device. For instance, the network bandwidth may be estimated based upon the size of the video chunk (e.g., which may be determined from a manifest file for the video, or the like) and the quantity of the video chunk downloaded in a given period of time. In one example, the network bandwidth may be estimated from the download times for a plurality of video chunks or portions of video chunks, e.g., prior to and/or including the current video chunk. In addition, in one example, step 520 may include detecting that the network bandwidth is below a threshold bandwidth level. For instance, the processing system may detect that the network bandwidth has fallen below a level that would support the completion of the download of the current video chunk (or at least a portion thereof comprising $f_i^{min}$ or $f_i^{VQ}$) within a timeout period. In other words, step 520 may instead anticipate that $f_i^{min}$ or $f_i^{VQ}$ will not be received before the actual timeout occurs. In another example, step 520 may include similar operations as described in connection with the process 300 of FIG. 3, e.g., to determine that $f_i^{min}$ number of frames of the first video chunk is received when a per-chunk timeout is reached, and waiting to continue to receive additional frames of the first video chunk until $f_i^{VQ}$ is reached for as long as the buffer does not fall below a minimum buffer occupancy threshold.

In another example, the second video chunk may be stored on another device or system from which the processing system may request the second video chunk. Thus, for instance, the second plurality of frames may be received from the same or a different source over a network in accordance with the request from the processing system at step 560. In still another example, step 570 may be an optional step. For instance, in an illustrative example, there may be no frames and/or packets of the first video chunk that are still in flight. Thus, in one example, step 570 may be omitted. In one example, the receiving of the first plurality of frames of the first video chunk from the source device may be considered a separate step, e.g., prior to and/or contemporaneous with step 520. In another example, when it is determined that the number of the first plurality of frames does not exceed the threshold, the method 500 may further comprise: requesting an alternate video chunk for the first time block, wherein the alternate video chunk is encoded at a lower bitrate than the first bitrate of the first video chunk.

In one example, the method 500 may alternatively comprise using two or more transport layer sessions, e.g., dual sessions. For instance, in an additional example, the source device and processing system (e.g., player device) may communicate via a TCP session. For instance, the source device may use an appropriate sized TCP transmit buffer such that a SYN packet sent by processing system/client may include application layer messaging for a server application to stop sending packets for the current chunk. For example, the source device may not feed new data to a transmit TCP buffer after receiving such an indication. In addition, in one example, the client TCP of the processing system may be configured to not close the TCP session/connection for, e.g., 3 seconds or some other time to allow in flight packets to be received, while at the same time, a new TCP connection/session may be established for the source device to transmit and for the processing system/client to receive the first plurality of packets of the next chunk.

Alternatively, the client (processing system) and server (source device) TCP agents/services may be configured to exchange information on the last sequence number in a current transmit request, where the client TCP agent/service may be further configured to transmit an ACK to the server TCP agent with the last sequence number, even if not actually received. In such case, the server TCP agent may transmit a RST, which may be in flight behind any other in flight data packets for the frames of the current chunk, or may send an ACK packet acknowledging, for instance, three congestion windows ahead of the last received, or some other numbers based on an estimate of which congestion windows will likely be sent onto the network by the source device before receiving the ACK and executing the stop instruction. For example, the source device TCP agent may be further configured to accept a stop instruction from a client application and discard any un-transmitted data in the TCP transmit buffer without trying to send.

At the same time, an additional transport connection (e.g., a second TCP connection/session) may be invoked by the processing system for the source device to actively begin sending data. This can be via a signaling message to an application layer video server service via the first transport connection, or signaling via the second transport connection (which may be open, but idle, i.e., not currently sending frames of the video). In yet another example, the processing system and source device may use a first transport connection comprising a first UDP session, and a second transport connection comprising a second UDP session. For instance, the method 500 may use UDP with any kind of application layer retransmission and packet recovery mechanism, with further features as discussed above with respect to TCP.

Thus, as noted above, although examples of the present disclosure are described primarily in connection with QUIC, the present disclosure may be implemented with any transport protocol where the server/sender can be told to stop packet transmission, without actually closing the connection, and that allows the player/client to receive packets in flight, whether packets of the next chunk are sent and received over a different stream in a same connection or in a new connection while the old connection is held open. Accordingly, examples of the present disclosure may implement any proposed or future transport protocol or application layer techniques over UDP or the like, e.g., as an alternatively or complementary to QUIC, such as a version of TCP, UDP, or another transport protocol that may permit two connections/sessions to be established and contemporaneously maintained between two endpoints. Thus, these and other modifications are all contemplated within the scope of the present disclosure.

In addition, although not expressly specified above, one or more steps of the method 500 may include a storing, displaying and/or outputting step as required for a particular application. In other words, any data, records, fields, and/or intermediate results discussed in the method can be stored, displayed and/or outputted to another device as required for a particular application. Furthermore, operations, steps, or blocks in FIG. 5 that recite a determining operation or involve a decision do not necessarily require that both branches of the determining operation be practiced. In other words, one of the branches of the determining operation can be deemed as an optional step. In addition, one or more steps, blocks, functions, or operations of the above described method 500 may comprise optional steps, or can be combined, separated, and/or performed in a different order from that described above, without departing from the example embodiments of the present disclosure. The method 500 may also be expanded to include additional steps. Thus, these and other modifications are all contemplated within the scope of the present disclosure.

It should be noted that in one example, the present disclosure may also include a server/source device-side process/method that is complementary to the method 500. For instance, a server (such as CDN edge server) may store different chunks for different variants/tracks of an ABR video, may receive a request to transmit a first video chunk, may transmit a first plurality of frames of the first video chunk via a transport connection, may receive an indication to stop transmitting additional frames of the first video chunk from a client device/ABR player and a request for a next video chunk or a next time block of the video, may open a new transport connection or a new stream within a current transport connection, or may use an existing secondary transport connection or stream within the current transport connection to transmit frames of the next video chunk to the client device, and so forth.

FIG. 6 depicts a high-level block diagram of a computing device or processing system specifically programmed to perform the functions described herein. For example, any one or more components or devices illustrated in FIG. 1 or described in connection with the examples of FIGS. 2-5 may be implemented as the system 600. As depicted in FIG. 6, the processing system 600 comprises one or more hardware processor elements 602 (e.g., a central processing unit (CPU), a microprocessor, or a multi-core processor), a memory 604 (e.g., random access memory (RAM) and/or read only memory (ROM)), a module 605 for receiving and playing frames of a video chunk transmitted by a source device after the sending and prior to the receiving of an indication to stop transmitting additional frames of the video chunk, and various input/output devices 606 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). In accordance with the present disclosure input/output devices 606 may also include antenna elements, transceivers, power units, and so forth. Although only one processor element is shown, it should be noted that the computing device may employ a plurality of processor elements. Furthermore, although only one computing device is shown in the figure, if the process(es) or method(s) as discussed above is/are implemented in a distributed or parallel manner for a particular illustrative example, i.e., the steps of the above process(es) and/or method(s) are implemented across multiple or parallel computing devices, e.g., a processing system, then the computing device of this figure is intended to represent each of those multiple computing devices.

Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The hardware processor 602 can also be configured or programmed to cause other devices to perform one or more operations as discussed above. In other words, the hardware processor 602 may serve the function of a central controller directing other devices to perform the one or more operations as discussed above.

It should be noted that the present disclosure can be implemented in software and/or in a combination of software and hardware, e.g., using application specific integrated circuits (ASIC), a programmable gate array (PGA) including a Field PGA, or a state machine deployed on a hardware device, a computing device or any other hardware equivalents, e.g., computer readable instructions pertaining to the method discussed above can be used to configure a hardware processor to perform the steps, functions and/or operations of the above disclosed process(es) and/or method(s). In one example, instructions and data for the present module or process 605 for receiving and playing frames of a video chunk transmitted by a source device after the sending and prior to the receiving of an indication to stop transmitting additional frames of the video chunk (e.g., a software program comprising computer-executable instructions) can be loaded into memory 604 and executed by hardware processor element 602 to implement the steps, functions, or operations as discussed above in connection with the illustrative process(es) and/or method(s). Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method can be perceived as a programmed processor or a specialized processor. As such, the present module 605 for receiving and playing frames of a video chunk transmitted by a source device after the sending and prior to the receiving of an indication to stop transmitting additional frames of the video chunk (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette, and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various examples have been described above, it should be understood that they have been presented by way of illustration only, and not a limitation. Thus, the breadth and scope of any aspect of the present disclosure should not be limited by any of the above-described examples, but should be defined only in accordance with the following claims and their equivalents.

What is claimed is:

1. A method comprising:
    determining, by a processing system including at least one processor, a risk of stall condition of a playback of a video, wherein the risk of stall condition is determined during a downloading of a first video chunk associated with a first time block of a video from a source device, wherein the first video chunk is encoded at a first bitrate of a plurality of available bitrates of the video;
    determining, by the processing system in response to the risk of stall condition, that a number of a first plurality of frames of the first video chunk received from the source device exceeds a threshold;
    transmitting, by the processing system, a request for a next video chunk associated with a next time block of the video following the first time block and an indication to the source device to stop transmitting additional frames of the first video chunk, in response to the determining that the number of frames exceeds the threshold;
    receiving, by the processing system, a second plurality of frames of the first video chunk from the source device, wherein the second plurality of frames of the first video chunk were transmitted by the source device prior to receiving the indication to stop transmitting the additional frames of the first video chunk;
    receiving, by the processing system, a first plurality of frames of the next video chunk; and
    playing, by the processing system, the first plurality of frames of the first video chunk, the second plurality of frames of the first video chunk, and the first plurality of frames of the next video chunk.

2. The method of claim 1, wherein the threshold is based upon a per chunk loss tolerance.

3. The method of claim 2, wherein the playing comprises playing the first plurality of frames of the first video chunk and the second plurality of frames of the first video chunk when it is determined that the threshold number of frames is received.

4. The method of claim 2, further comprising:
    determining a first video quality associated with the number of the first plurality of frames that are received; and
    determining whether the first video quality is higher or lower than a second video quality associated with a lower bitrate of an adaptive bitrate streaming protocol as compared to the first bitrate of the first video chunk.

5. The method of claim 4, wherein the next video chunk is requested having the first bitrate as the first video chunk when the first video quality is higher than the second video quality, and wherein the next video chunk is requested having the lower bitrate when the first video quality is lower than the second video quality.

6. The method of claim 1, further comprising:
    transmitting a request for the first video chunk, wherein the downloading comprises receiving the first plurality of frames of the first video chunk from the source device in response to the request for the first video chunk.

7. The method of claim 1, wherein the first plurality of frames of the first video chunk and the second plurality of frames of the first video chunk are received via a first stream, and wherein the first plurality of frames of the next video chunk is received via a second stream.

8. The method of claim 7, wherein the first stream and the second stream are part of a first transport connection.

9. The method of claim 8, wherein the first transport connection comprises a quick uniform datagram protocol internet connections protocol connection.

10. The method of claim 8, wherein the request for the next video chunk associated with the next time block of the video is transmitted via the second stream.

11. The method of claim 10, wherein the request for the next video chunk associated with the next time block of the video establishes the second stream.

12. The method of claim 8, wherein the first stream is part of a first transport connection and the second stream is part of a second transport connection.

13. The method of claim 12, wherein the first transport connection comprises a first transmission control protocol session, and wherein the second transport connection comprises a second transmission control protocol session.

14. The method of claim 12, wherein the first transport connection comprises a first uniform datagram protocol session, and wherein the second transport connection comprises a second uniform datagram protocol session.

15. The method of claim 1, wherein video chunks of the video including the first video chunk are encoded according to an encoding protocol using forward encoding.

16. The method of claim 1, wherein video chunks of the video including the first video chunk are encoded according to an Alliance for Open Media Video 1 (AV1) protocol.

17. The method of claim 1, wherein video chunks of the video including the first video chunk are encoded according to an encoding protocol using bidirectional interframe encoding, wherein frames of the first video chunk including the first plurality of frames are received from the source device in an order in which non-reference bidirectional predicted frames of the first video chunk are transmitted after other frames of the first video chunk.

18. The method of claim 1, wherein video chunks of the video including the first video chunk are encoded according to an advanced video coding protocol or a high efficiency video coding protocol.

19. A non-transitory computer-readable medium storing instructions which, when executed by a processing system including at least one processor, cause the processing system to perform operations, the operations comprising:
    determining a risk of stall condition of a playback of a video, wherein the risk of stall condition is determined during a downloading of a first video chunk associated with a first time block of a video from a source device, wherein the first video chunk is encoded at a first bitrate of a plurality of available bitrates of the video;
    determining, in response to the risk of stall condition, that a number of a first plurality of frames of the first video chunk received from the source device exceeds a threshold;
    transmitting a request for a next video chunk associated with a next time block of the video following the first time block and an indication to the source device to stop transmitting additional frames of the first video chunk, in response to the determining that the number of frames exceeds the threshold;
    receiving a second plurality of frames of the first video chunk from the source device, wherein the second plurality of frames of the first video chunk were transmitted by the source device prior to receiving the indication to stop transmitting the additional frames of the first video chunk;

receiving a first plurality of frames of the next video chunk; and playing the first plurality of frames of the first video chunk, the second plurality of frames of the first video chunk, and the first plurality of frames of the next video chunk.

20. An apparatus comprising:

a processing system including at least one processor; and a computer-readable medium storing instructions which, when executed by the processing system, cause the processing system to perform operations, the operations comprising:

determining a risk of stall condition of a playback of a video, wherein the risk of stall condition is determined during a downloading of a first video chunk associated with a first time block of a video from a source device, wherein the first video chunk is encoded at a first bitrate of a plurality of available bitrates of the video;

determining, in response to the risk of stall condition, that a number of a first plurality of frames of the first video chunk received from the source device exceeds a threshold;

transmitting a request for a next video chunk associated with a next time block of the video following the first time block and an indication to the source device to stop transmitting additional frames of the first video chunk, in response to the determining that the number of frames exceeds the threshold;

receiving a second plurality of frames of the first video chunk from the source device, wherein the second plurality of frames of the first video chunk were transmitted by the source device prior to receiving the indication to stop transmitting the additional frames of the first video chunk;

receiving a first plurality of frames of the next video chunk; and playing the first plurality of frames of the first video chunk, the second plurality of frames of the first video chunk, and the first plurality of frames of the next video chunk.

* * * * *